United States Patent [19]

Granestrand

[11] Patent Number: 5,202,941
[45] Date of Patent: Apr. 13, 1993

[54] FOUR SECTION OPTICAL COUPLER
[75] Inventor: Per O. Granestrand, Tyresö, Sweden
[73] Assignee: Telefonaktiebolaget L M Ericsson, Stockholm, Sweden
[21] Appl. No.: 801,483
[22] Filed: Dec. 2, 1991
[51] Int. Cl.[5] .................. G02B 6/10; G02B 6/00; G02F 1/00
[52] U.S. Cl. ..................................... 385/41
[58] Field of Search ...................... 385/4, 8, 41

[56] References Cited
U.S. PATENT DOCUMENTS

| | | | |
|---|---|---|---|
| 4,711,515 | 12/1987 | Alferness | 385/8 |
| 4,756,588 | 7/1988 | Granestrand | 385/8 |
| 4,832,431 | 5/1989 | Nolting et al. | 385/8 |
| 4,856,094 | 8/1989 | Heidrich et al. | 385/4 |
| 4,917,449 | 4/1990 | Granestrand | 350/96.14 |

OTHER PUBLICATIONS

H. Heidrich et al., "Integrated Optical Compensator in Ti:LiNbO3 for Continuous and Reset-Free Polarization Control", ECOC 1987, Proc., vol. 1, pp. 257–260.
R. Noé et al., "Automatic Endless Polarization Control with Integrated-Optical Ti:LiNbO3 Polarization Transformers", Optics Letters, Jun. 1988, vol. 13, No. 6, pp. 527–529.
N. G. Walker et al., "Endless Polarisation Control Using an Integrated Optic Lithium Niobate Device", Electronics Letters, 3rd Mar. 1988, vol. 24, No. 5, pp. 260–268.
M. Minakata et al., "Precise Determination of Refractive-Index Changes in Ti-Diffused LiNbO3 Optical Waveguides", J. Appl. Phys., 49(9), Sep. 1978, pp. 4677–4682.
C. H. Bulmer, W. K. Burns, "Polarization Characteristics of LiNbO3 Channel Waveguide Directional Couplers", Journ. Lightwave Tech., vol. LT-1, No. 1, Mar. 1983, pp. 227–236.
M. Kondo et al., "Low-Drive-Voltage and Low-Loss Polarization-Independent LiNbO3 Optical Waveguide Switches", Electronics Letters, vol. 23, No. 21, 8th Oct. 1987, pp. 1167–1169.

R. C. Alferness, "Polarization-Independent Optical Directional Coupler Switch Using Weighted Coupling", Appl. Phys. Lett., 35(10), 15 Nov. 1979, pp. 748–750.
O. G. Ramer, C. Mohr, J. Pikulski, "Polarization-Independent Optical Switch with Multiple Sections of $\Delta\beta$ Reversal and a Gaussian Taper Function", IEEE Journal Quantum Electronics, vol. QE-18, No. 10, Oct. 1982, pp. 1772–1779.
L. McCaughan, "Low Loss Polarization Independent Electrooptical Switching at $\lambda=1.3$ $\mu$m", IEEE Journ. Lightwave Tech., vol. LT-2 (1984), pp. 51–55.
Y. Bourbon et al., "Polarisation-Independent Modulators with Ti:LiNbO3 Strip Waveguides", Electronics Letters, vol. 20, No. 12, 7th Jun. 1984, pp. 496–497.
(List continued on next page.)

Primary Examiner—Akm E. Ullah
Attorney, Agent, or Firm—Burns, Doane, Swecker & Mathis

[57] ABSTRACT

Polarization independent switch or coupler including a directional coupler with extremely relaxed fabrication tolerances. The coupler includes a mono-crystalline wafer of electro-optic material with two closely adjacent light waveguides at an upper surface along with electrodes positioned adjacent the waveguides. The electrodes include a grounded, main electrode formed on one side of the waveguides and four smaller electrodes formed in a line on a side or sides of the waveguides opposite to the main electrode, each of the four smaller electrodes being supplied with a voltage. The electrodes and waveguides can be in a planar or stacked relationship to one another. When the voltages applied to the middle two electrodes have equal values and have like polarity ($V_c=V_b$) and the voltages applied to the outer electrodes have equal values and like polarity ($V_d=V_a$), the light travelling in one waveguide is barred from transferring to another waveguide.

20 Claims, 13 Drawing Sheets

OTHER PUBLICATIONS

J. E. Watson, "A Low-Voltage Polarization-Independent Guided-Wave Direction-Coupler Switch in Lithium Niobate", SPIE, vol. 835, Integrated Optical Circuit Engineering vol. (1987), pp. 132–135.

N. Tsukada, T. Nakayama, "Polarization-Insensitive Integrated-Optical Switches: A New Approach", IEEE Journal Quantum Electronics, vol. QE-17, No. 6, Jun. 1981, pp. 959–964.

J. E. Watson et al., "A Polarization—Independent 1×16 Guided-Wave Optical Switch Integrated on Lithium Niobate", Jour. Lightwave Tech., vol. LT-4, No. 11, Nov. 1986, pp. 1717–1721.

W. K. Burns, T. G. Giallorenzi, R. P. Moeller, E. J. West, "Interferometric Waveguide Modulator with Polarization-Independent Operation", Applied Physics Letters, vol. 33, No. 1, 1 Dec. 1978, pp. 944–947.

P. Granestrand, B. Stoltz, L. Thylén, "Polarization Independent Integrated Optics Switches", Fourth European Conference on Integrated Optics, 1987, pp. 36–39.

P. Granestrand, L. Thylén, B. Stoltz, "Polarisation Independent Switch and Polarisation Splitter Employing $\Delta\beta$ and $\Delta\kappa$ Modulation", Electronics Letters, vol. 24, No. 18, 1st Sep. 1988, pp. 1142–1143.

J. L. Nightingale et al., "Low-Voltage, Polarization—Independent Optical Switch in Ti-Indiffused Lithium Niobate", Integrated and Guided-Wave Optics, 1989 Technical Digest Series, vol. 4, paper MAA3, pp. 10–13.

K. Takizawa et al., "Polarization—Independent and Optical-Damage-Insensitive $LiNbO_3$ Interferometric Waveguide Modulator", Japanese Journ. Appl. Phys., vol. 27, No. 4, Apr. 1988, pp. L696–L698.

H. Yajima, "Dielectric Thin-Film Optical Branching Waveguide", Appl. Phys. Lett., vol. 22, No. 12, 15 Jun. 1973.

W. K. Burns and A. F. Milton, "Mode Conversion in Planar-Dielectric Separating Waveguides", IEEE Journ. Quantum Electronics, vol. QE-11, No. 1, Jan. 1975, pp. 32–35.

P. Granestrand et al., "Integrated Optics 4×4 Switch Matrix with Digital Optical Switches", Electronics Letters, vol. 26, No. 1, 4th Jan. 1990, pp. 4–5.

Y. Silberberg et al., "Digital Optical Switch", Tech. Digest OFC, 1988, paper THA3.

R. A. Spanke, "Architectures for Large Nonblocking Optical Space Switches", IEEE Journ. Quantum Electronics, vol. QE-22, No. 6, Jun. 1986, pp. 964–967.

H. F. Taylor, "Polarization Independent Guided-Wave Optical Modulators and Switches", Journ. Lightwave Tech., vol. LT-3, No. 6, Dec. 1985, pp. 1277–1280.

T. Pohlmann, A. Neyer, and E. Voges, "Polarization-Independent Switches on $LiNbO_3$", Proceedings of the Topical Meeting on Integrated Photonics Research, Hilton Head, S.C., 1990, pp. 38–39.

R. A. Steinberg and T. G. Giallorenzi, "Design of Integrated Optical Switches for Use in Fiber Data Transmission Systems", IEEE Journ. Quantum Electronics, vol. QE-13, No. 4, Apr. 1977, pp. 122–128.

H. Kogelnik and R. V. Schmidt, "Switched Directional Couplers with Alternating $\Delta\beta$", IEEE Journ. Quantum Electronics, vol. QE-12, No. 7, Jul. 1976, pp. 396–401.

W. K. Burns and J. Warner, "Mode Dispersion in Uniaxial Optical Waveguides", Journ. Optical Soc. of America, vol. 64, No. 4, Apr. 1974, pp. 441–446.

J. Ctoroky, M. Cada, "Guided and Semileaky Modes in Anisotropic Optical Waveguides of the $LiNbO_3$ Type", Optics Communications, vol. 27, No. 3, Dec. 1978.

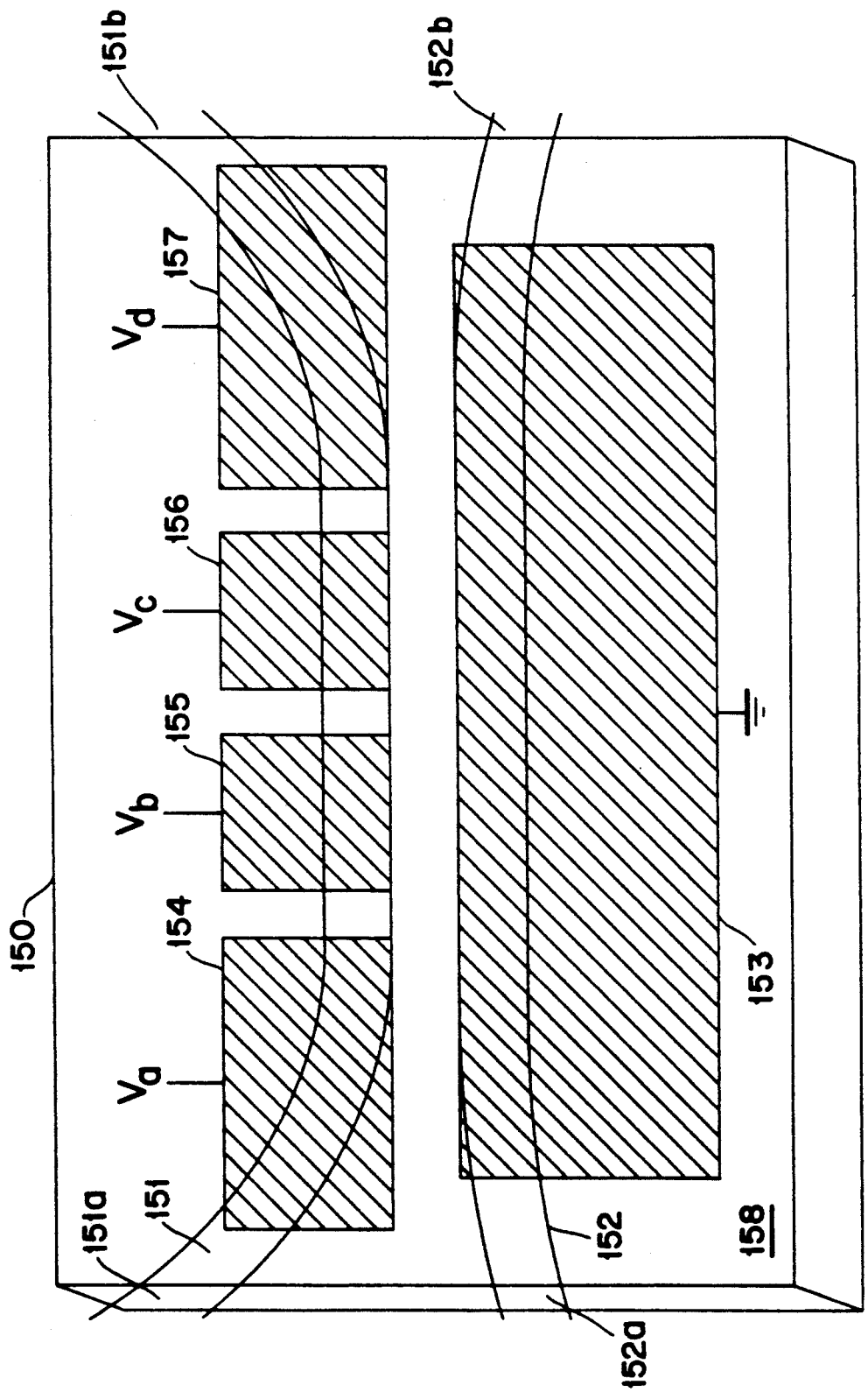

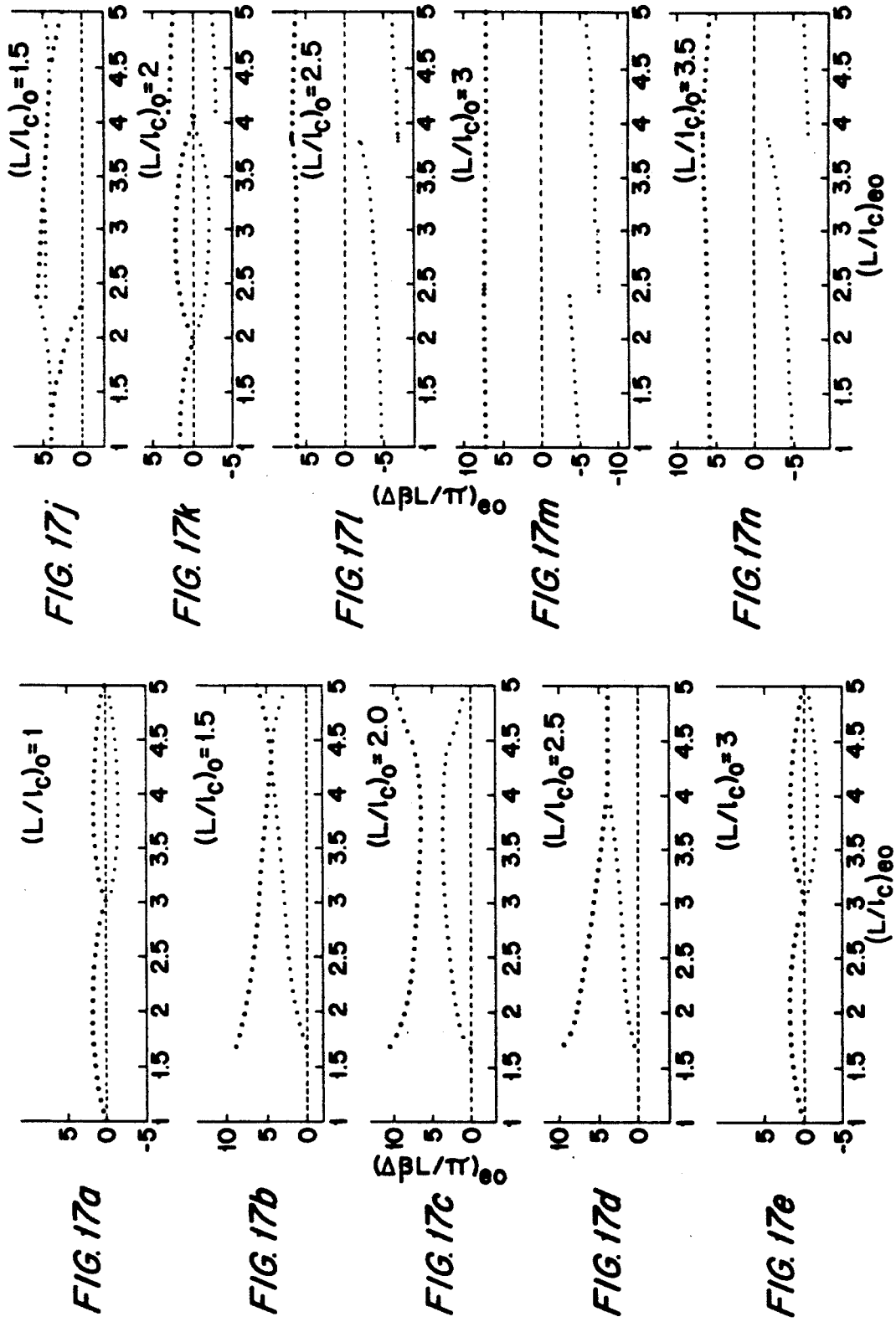

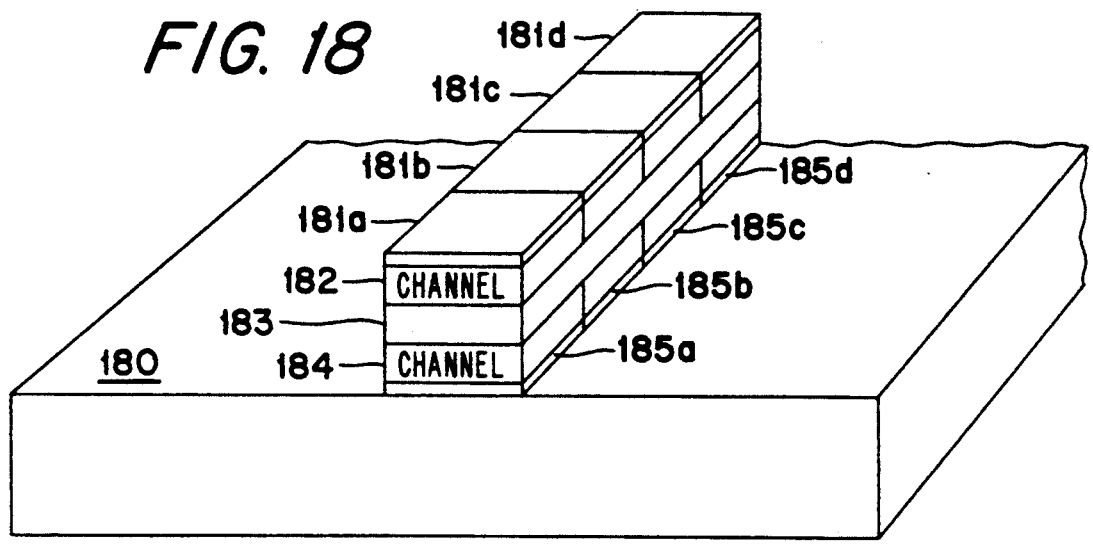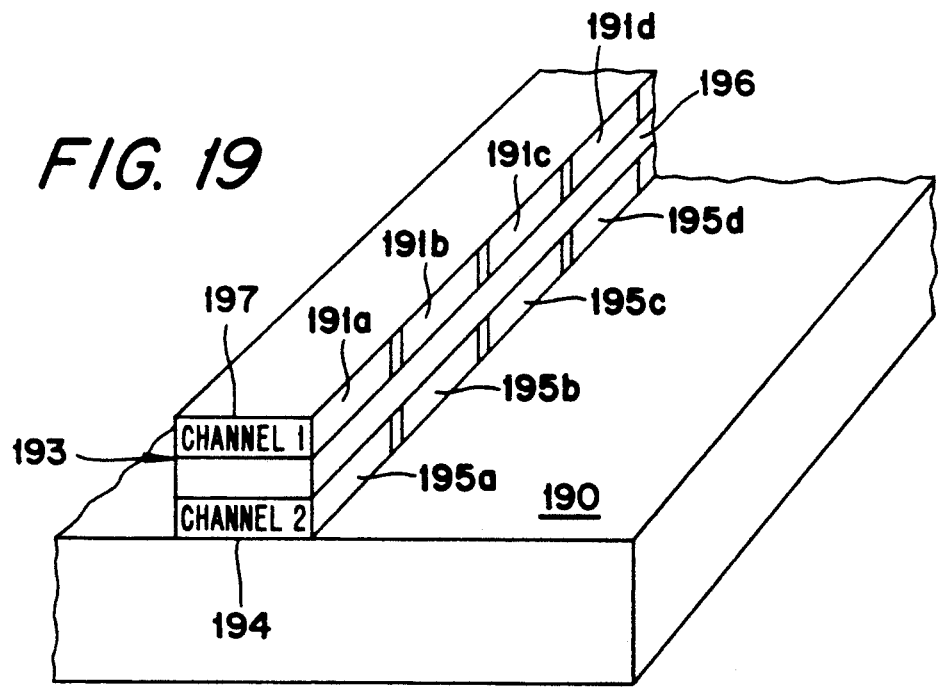

FOUR SECTION OPTICAL COUPLER

BACKGROUND OF THE INVENTION

1) Field of the Invention

The invention relates to an integrated optical circuit using thin film optical wave-guides for modulating or switching a light signal by an electro-optic effect.

2) Description of Related Art

The growing utilization of optical fibers in communications, sensors and other applications has made optical switching a subject of great interest. Of particular interest is the switching of signals in optical form without electro-optical transformations. Attempts have been made in a number of directions, such as by using mechanical switches and integrated optical space semiconductor switches made of semiconductor material such as GaAs and InP.

Many of these switches use an electro-optical effect for the switching function. A quadratic or Kerr electro-optical effect is present in all substances and refers to a change in refractive index $\Delta n$ proportional to a square of the applied electric field E. Much larger index changes can be realized in single crystals that exhibit a linear or Pockel's electro-optic effect. In this case the change of refractive index $\Delta n$ is directly proportional to the applied electric field E. The effect is present only in noncentrosymmetric single crystals, and the induced index change depends upon the orientation of the electric field E and the polarization of the light beam. Well known linear electro-optic materials include potassium dihydrogen phosphate (KDP) and its deuterated isomorph (DKDP or KD*P), lithium niobate ($LiNbO_3$) and lithium tantalate ($LiTaO_3$), and semi-conductors such as gallium arsenide (GaAs) and cadmium telluride (CdTe).

To date, one of the most mature technologies for fabrication of integrated optics circuits (IOC's) is Ti:$LiNbO_3$, which involves a ribbon guide formed by diffusing titanium into lithium niobate. The lithium niobate guide is formed in a mono-crystalline wafer upon which longitudinal electrodes are formed adjacent the ribbon guide. The electrodes modify the local value of the refractive index when a potential difference is applied.

In this technology, relatively low loss channels with good spot-size matching to single mode fibers can conveniently be fabricated. However, there is one important problem; the $LiNbO_3$ components are inherently polarization dependent, i.e., they require excitation of a specific linear polarization ("ordinary" mode or "extraordinary" mode, TE or $TM^9$, dependent on crystal orientation), whereas the state of polarization (SOP) at the output of a single mode fiber will exhibit a random behavior. This problem is usually solved by using polarization maintaining fibers.

There are, however, a number of drawbacks with using polarization maintaining fibers. First, these fibers are more complicated to handle than conventional single mode fibers because they must be aligned angularly. This type of fiber is also quite expensive, ranging as much as a factor of ten times more expensive than the conventional single mode fiber. Further, this fiber is not a standard fiber, nor will it likely be in the foreseeable future. It is not used in existing networks, and that fact makes this solution prohibitive in a number of applications.

There are a number of alternative solutions, one being polarization scrambling. Polarization scrambling involves scrambling the input polarization at high speed, which ensures enough power in the desired polarization (TE or TM) whereas the orthogonal polarization is blocked in a polarizer. This blocking causes a penalty of approximately 3 dB and the approach requires fast polarization scramblers because they must work on a frequency comparable to the bit rate. However, the polarization scramblers are not broadband, which takes away the "frequency transparency" of the switches.

Polarization diversity is another alternative. With this solution the signal is split up in two orthogonal polarization components which are processed separately and then eventually (depending on application) combined again. This means that polarization splitters are needed and that the number of optical switch elements (e.g., 2×2 switches) must be doubled.

Yet another solution is polarization stabilization. When polarization stabilization is employed, the polarization is regulated by a feedback loop. With polarization stabilization, the signal polarization must be measured in some way, which sometimes does not complicate the system significantly (e.g., coherent systems) but in other cases introduces significant undesirable complexity. This solution has successfully been implemented in Ti:$LiNbO_3$ type devices. See, e.g., H. Heidrich et al, "Integrated Optical compensator on Ti:$LiNbO_3$ For Continuous and Reset Free Polarization Control", ECOC '87, Proc., Vol. 1, pp 257–260; R. Noe et al., "Automatic Endless Polarization Control With Integrated Optical Ti:$LiNbO_3$ Polarization Transformers", Optics Letters, 1988, Vol. 13, No. 6, pp 527–529: N. G. Walker et al, "Endless Polarization Control Using an Integrated Optic Lithium Niobate Device", Electron. Lett., 1988, Vol 24, No 5, pp 260–268.

All of the above-mentioned solutions require adaptation to the inherent polarization dependency of the $LiNbO_3$ components, which serves to complicate the systems.

There are a number of concepts for polarization independent switches and modulators. See, e.g., M. Kondo et al, "Low Drive Voltage and Low Loss Polarization Independent $LiNbO_3$ Optical Waveguide Switches", Electron. Lett., Vol 23, (1987), pp 1167–1169; R. C. Alferness, "Polarization Independent Optical Directional Coupler Switch Using Weighted Coupling", Appl. Phys. Lett., 'Vol 35, (1979), pp 748–750; O. G. Ramer et al., "Polarization Independent Optical Switch with Multiple Sections of $\Delta\beta$ Reversal and a Gaussian Taper Function", IEEE Journ. Quantum Electron. Vol QE-18 (1982), pp 1772–1779; L. McCaughan, "Low Loss Polarization Independent Electrooptical Switching at $\lambda=1.3$ $\mu m$", IEEE Journ. Lightwave Techn., Vol LT-2, (1984), pp 51–55; Y. Bourbon et al., "Polarization-Independent Modulator with Ti:$LiNbO_3$ Strip Waveguides", Electron. Lett. Vol 20 (1984), pp 496–497; N. Tsukada et al., "Polarization-Insensitive Integrated-Optical Switches: A new approach", IEEE Journ. Quantum Electron., Vol QE-17, (1981), pp 959–964; J. E. Watson, "A Low-Voltage Polarization Independent Guided Wave Direction- Coupler Switch in Lithium Niobate", SPIE Vol 835, Integrated Optical Circuit Engineering V, (1987), pp 132–135; J. E. Watson et al., "A polarization Independent 1×16 Guided-Wave Optical Switch Integrated on Lithium Niobate", Journ. Lightwave Techn., Vol LT-4, (1986), pp 1717–1721; W. K. Burns et al., "Interferometric Waveguide Modulator with Polarization-Independent Operation", Applied Physics Letters, Vol 33 (1978), p 944; P. Granestrand et al., "Polarization Independent Optical Switches", Fourth European Conference on Integrated Optics (ECIO '87) pp 36–39; P. Granestrand et al., "Polarization Independent Switch and Polarization Splitter Employing $\Delta\beta$ and $\Delta\beta$ Modulation", Electron. Lett. 1988, 1142–1143; J. L. Nightingale et el, "Low-Voltage Polarization Independent Optical Switch in Ti-indiffused Lithium Niobate", Techn. Digest of Integrated and Guided Wave Optics Conf. (IGWO '89), paper MAA3, pp 10–13; K. Takizawa et al., "Polarization-Independent and Optical Damage-insensitive LiNbO$_3$ Interferometric Waveguide Modulator", Japanese Journal of Applied Physics, Vol 27 (1988), pp L696–L698; Y. Silberberg et al., "Digital Optical Switch" Techn. Digest OFC 1988, paper THA3; H. F. Taylor, "Polarization Independent Guided wave Optical Modulators and Switches", IEEE Journ. Lightwave Techn. Vol LT 3 (1985), pp 1277–1280; T. Pohlmann et al., "Polarization independent switches on LiNbO$_3$", Proceedings of the Topical Meeting on Integrated Photonics Research, Hilton Head, S.C., 1990, pp 38–39. The first experimental results on polarization independent switches were reported by Alferness in 1979.

FIG. 1 represents the Alferness switch. It is a directional coupler 10 utilizing weighted coupling. The separation between the waveguides 11 and 12 is varied along the coupler length and, therefore, the coupling between the waveguides 11 and 12 is also varied. The coupling is longitudinally weighted and, therefore, there is no constant waveguide separation region. The weighted coupling is exploited when the bar state (uncrossed state) is realized. By proper design of the weighting, it is possible to press down the side lobes of the transfer function (i.e., the power fraction coupled from the excited waveguide to the other waveguide as the switch output as a function of drive voltage). This is illustrated in FIGS. 2a and 2b where the transfer function of a conventional directional coupler (FIG. 2a) is compared to that of a weighted coupler (FIG. 2b).

FIGS. 2a and 2b show the transfer function for a uniform $\Delta\beta$ operation of a conventional directional coupler with weighted coupling demonstrating the effect of the weighting of the coupling coefficients. The weighting is performed with a Hamming function. The solid line correspond to "extraordinary" mode (TM in the switch discussed in the Alferness article) and the dashed line corresponds to "ordinary" mode (TE in the switch discussed in the Alferness article). The ratio $\Delta\beta_{oo}/\Delta\beta_o$ is assumed to be 3.1 and $(L/l_c)_{oo} \approx 1.5$ and $(L/l_c)_o \approx 1.1$, where $\Delta\beta_{oo}$ is the difference in wave number between the channels in the extraordinary mode, $\Delta\beta_o$ is the difference in wave number between the channels in the ordinary mode, L is the physical length of the coupler, and $l_c$ is the coupling length, are chosen as examples.

When a voltage is applied which corresponds to the first bar state for the polarization which sees the weakest electro-optic coefficient, the other polarization will also be switched even if the drive voltage happens to correspond to a local maximum for that polarization, because of the depressed side lobes. In FIGS. 2a and 2b, a −25 dB cross-talk level is indicated, demonstrating that this level can be maintained even if parameters such as $\Delta\beta_{oo}/\Delta\beta_o$, $(L/l_c)_{oo}$ and $(L/l_c)_o$ are varied somewhat for the case of the weighted coupler.

The implementation of the cross state is explained in conjunction with FIG. 3. FIG. 3 shows a switch diagram where the locus of cross states are shown with $L/l_c$ on the vertical axis and $\Delta\beta L/\pi$ (normalized drive voltage) on the horizontal axis. When a voltage is applied which corresponds to a "perfect" cross state for the "extraordinary" mode, the other polarization will also be in a reasonable cross state because of the shape of the diagram near $L/l_c \approx 1$. The cross state relies on fabricating the switch in such a way that the $L/l_c$ ratio for the mode which sees the weakest electro-optic coefficient is slightly over 1 (TE mode in this Z-cut, Y propagating case) and between 1 and 3 for the other polarization. In this case the "ordinary" polarization will be in a reasonable cross state up to relatively high voltages because the tangential of the cross state locus of FIG. 3 is almost horizontal near $L/l_c \approx 1$. This is also true for $L/l_c \approx 3$.

FIG. 4 represents a polarization independent switch 40, reported in the L. McCaughan article. The switch 40 is almost the same as shown in the FIG. 1 (and the Alferness article) with the exception that the electrodes are not divided into two sections. In other words, the switch 40 of FIG. 4 includes two waveguides 41, 42 in a substrate with two electrodes 43, 44 closely adjacent the waveguides 41, 42. A voltage V is applied to one electrode 44 while the other electrode 43 is grounded. Therefore, only uniform $\Delta\beta$-operation is possible and the cross state must be reached at zero voltage, which means that the switch 40 must be fabricated in such a way that the $L/l_c$ ratio is approximately equal to 1 for both polarizations. In the Watson article, the Alferness concept is analyzed in more detail and operation with the TE mode near $L/l_c \approx 3$ is proposed. This is compatible with the outcome of fabrication parameters adapted to give low bend losses at longer wavelengths. In this case the polarization which sees the ordinary index is less confined which gives the corresponding mode a higher $L/l_c$ ratio compared to the other polarization.

FIG. 5 shows combinations of $L/l_c$ ratios permitted to give low or "perfect" cross-talk in cross state for switch shown in FIG. 1. In FIG. 5, $\Delta\beta_{TE}/\Delta\beta_{TM}=0.26$. If a finite cross-talk is permitted, the lines in FIG. 5 widen to form tube shapes. See, the Watson et al. article.

A further extension of the Alferness concept is shown in FIG. 6a and reported in P. Granestrand et al., "Polarization Independent Switch and Polarization Splitter Employing $\Delta\beta$ and $\Delta$ Modulation", Electron. Lett. 1988, 1142–1143. In this case a X-cut, Y propagating orientation is chosen. The switch 60 is a directional coupler with circular bends at the input and output of the waveguides 61 and 62 and with electrodes 63, 64, 65, 66, 67 and 68 following the contours of the waveguides 61 and 62. When the drive voltages are supplied in accordance with FIG. 6b, it is possible to form a superposition of an even and an odd perturbation of the refractive index (only the horizontal component of the electrical field will induce index perturbations in this crystal orientation). If only an even perturbation is applied the directional coupler will stay symmetric but with an altered coupling strength between the waveguides. This corresponds to a $\Delta\kappa$ modulation or a transformation parallel to the vertical axis in a switch diagram such as shown in FIG. 6c (where $\Delta\beta_{TM}/\Delta\beta_{TE}=0.26$ and $\Delta\kappa_{TM}/\Delta\kappa_{TE}=0.35$). The conventional $\Delta\beta$-modulation (from the odd perturbation) corresponds to a transformation parallel to the horizontal axis in the switch diagram. This combination of $\Delta\beta$ and $\Delta\kappa$ modulation makes possible an electronic adjustment to polarization independent switch states. Because the $\Delta\kappa$ modulation is not very efficient in this configuration only small adjustments of the coupling length are assumed, otherwise high voltages will result.

In FIG. 6d the limits within it is possible to get a "perfect" (in coupled wave theory limit) polarization independent cross state is shown. FIG. 6d also shows $\Delta\beta_{TM}/\Delta\beta_{TE}=0.26$ and $\Delta\kappa_{TM}/\Delta\kappa_{TE}=0.35$. As can be seen the allowable fabrication tolerances are quite large. The bar state can also be adjusted electronically by a combination of $\Delta\beta$ and $\Delta\kappa$ modulation. FIG. 6e shows an example of the use of both $\Delta\beta$ and $\Delta\kappa$ modulation to get a "perfect" bar state. In the example shown in FIG. 6e, there are no limits for $(L/l_c)_{TE}$ and $(L/l_c)_{TM}$. In other words, there are no requirements on the coupling lengths and it is always possible to get a "perfect" polarization independent bar state. However, due to the weighted coupling obtained by the circular bends at the input and output of the switch, the side lobes of the transfer function will usually be pressed down to give reasonable cross-talk values even with "pure" uniform $\Delta\beta$ modulation. A realistic illustration of this is shown in FIG. 6f. FIG. 6f shows bar state switch contours for $-20$ dB cross-talk illustrating the effect of the circular bends at the input and output of the switch. The left diagram corresponds to the simple case of two parallel waveguides at constant separation and the right diagram corresponds to a directional coupler with circular bends at the input and output of the switch.

A different approach to make polarization independent switches is to utilize crystal orientations where the conditions are similar for the two polarizations. This means that the electro-optically induced perturbations are equal and that the TE and TM modes have approximately the same coupling lengths. The "isotropic" orientations with the Z-axis in the propagation direction are examples of such orientations. Here both polarizations see the ordinary refractive index and therefore the index perturbations due to titanium (Ti) concentration are equal for the two polarizations. This means that the coupling lengths are approximately equal. The electro-optically induced index perturbations for the two polarizations are caused by the electro-optic r-coefficients $r_{12}$ and $r_{22}$ (contracted index notation). They have equal magnitudes but opposite signs and the index 2 which is common in $r_{12}$ and $r_{22}$ implies that these perturbations correspond to external electrical fields along the Y-axis. One complicating factor in this context is the fact that the two polarizations are almost synchronous and that there is one electro-optic coefficient (of the same magnitude as $r_{12}$ and $r_{22}$) which performs a coupling between the two polarizations. This r-coefficient is $r_{61}$, indexed 1,2,1 in non-contracted notation. The index 6 (1,2 non-contracted) corresponds to coupling between electrical fields along the X and Y axis directions. The coupling is induced by an external electrical field along the X axis as indicated by the second listed index.

To get good performance in a switch in this orientation, this TE-TM conversion must be avoided. However, since the unwanted (TE$\leftarrow\rightarrow$TM) and the wanted ($\Delta n_{TM}$, $\Delta n_{TE}$) perturbations corresponds to different components of the external field, it is possible to avoid this coupling by proper design of the component. An example of this is shown in FIG. 7a. If the electrodes are placed in such a way that there is no net component in the X-direction (vertical in the X-cut example of FIG. 7), there will be no TE$\leftarrow\rightarrow$TM coupling and the switch will work well. It is, however, difficult to attain this goal because of fabrication imperfections (misalignment of electrodes, relative waveguides, difficulty in controlling the diffusion and so forth). This can be overcome by using electrodes that permit electrical adjustment of the field in such a way that the "effective" vertical field is canceled.

One possible solution is shown in FIG. 8a where the outermost electrodes 86a, 86b and 87a, 87b are used to adjust the "shape" of the electrical field to cancel out the net X component. See P. Granestrand et al., "Polarization Independent Optical Switches," ECIO '87, pp. 36-39. The other electrodes 83a, 83b, 84a, 84b, 85a, and 85b, and the waveguides 81 and 82 are similar to that shown in FIG. 7a. FIG. 8b shows the electric field formed by the electrodes. Note that the switch structures in FIGS. 7 and 8 also make possible $\Delta\kappa$ modulation to improve the switch states.

FIG. 9 shows another way to make polarization independent switches, which also employs an "isotropic" orientation (also X-cut). See, K. Takizawa et al., "Polarization-Independent and Optical Damage-insensitive LiNbO$_3$ Interferometric Waveguide Modulator", Japanese Journal of Applied Physics, Vol 27 (1988), pp L696-L698. This is a so called balanced bridge interferometric switch 90 which consists of a 3 dB coupler 96 at an input, a polarization independent phase shift region 97 including two grounded electrodes 93, 95 as well as an interposed biased electrode 94 and a 3 dB coupler 98 at the output. In the middle region 97 the waveguides are separated so there is no coupling between them. In this region the relative phase of the light is modulated and TE-TM coupling is not permitted here either, which means that no net vertical field is tolerated. However, this is probably simpler to avoid in this case compared to the switch of FIG. 7.

One advantage with Z-propagating concepts is that the same index (ordinary) is seen by the two different polarizations. Therefore, there will be no bandwidth degradation due to pulse broadening which occurs when different indices are seen by the two polarizations.

This difference will appear when crystal orientations with the Z axis perpendicular to the propagation direction is used and will limit the permitted bitrate to approximately 10 Gbit/s per channel for a 10 cm long chip in these orientations. However, if the information is stacked by some other principle, such as wavelength division multiplex or by coherent techniques, information band-widths in the THz-range can be switched even with switches in these orientations.

Another advantage with the Z-propagating concepts is that both polarizations will have approximately the same transfer function (in general for the other concepts the polarization independency mean that it is possible to put the switch in two polarization independent switch states but without independency in "intermediate" points). This is of most importance, e.g., when linear (small signal) modulation applications are considered.

All of the switch types mentioned above are so called interferometric switches, they are based on constructive and destructive interference of modes, therefore they all have oscillating transfer functions. There is, however, another possibility, and that is to use devices which are based on mode sorting instead of interferometry. See, W. K. Burns et al., "Mode Conversion in Planar Dielectric Separating Waveguides", IEEE Journ. of Quantum Electron., Vol QF-11 (1975), pp 32-35, and Y. Silberberg et al., "Digital Optical Switch," Tech. Digest OFC, 1988, paper THA3.

FIG. 10 shows a mode sorting switch 100. It is a 2×2 digital optical switch and consists of an asymmetrical Y-branch waveguide 101 at one side and a symmetrical Y-branch waveguide 102 at the other. The latter branch 102 can be made asymmetric by applying an electrical field via the electrodes 103 and 104. An asymmetric Y-branch performs mode sorting, given that the transformation is "adiabatic" (sufficiently slow). The mode sorting here means that the channel mode in the input waveguide with highest effective index gradually transforms along the branch to the first order mode of the two mode region where the channels are near and influence each other (there is no power transfer between the local normal modes, at large separation the first order mode has the shape of the channel mode). In the same way, the mode in the other channel transforms to the second order mode. So, the signal in the wide channel transforms to the first order mode in the middle region and the signal in the narrower channel transforms to the second order mode of the middle region. If the other half 102 of the switch 100 is also asymmetric (i.e., an odd index perturbation is induced) by applying a voltage to the electrodes 103 and 104 in a similar way, the first order mode in the middle region (corresponding to the wide input channel) transforms to the output channel with highest index and conversely the second order mode transforms to the output channel with lowest index.

Since the output Y-branch asymmetry can be electro-optically altered the device works as a 2×2 switch provided that the index perturbation is large enough and that the transformation is adiabatic. If zero voltage is applied to the electrodes, a 3 dB splitting will occur for both signals.

In FIG. 11 a transfer function for a digital optical switch for TE (solid line) and TM (dashed line) is show (X-cut case). As can be seen the transfer function does not have the oscillatory behavior of interferometric switches and the switch will obviously operate polarization independently given that the magnitude of the drive voltage is high enough.

A significant advantage of the digital optical switch is its superb stability performance. The instabilities caused by DC drift and temperature variations appear as variations of the "effective" applied voltage, and the digital response with its small transfer function slope attenuates the induced switch state perturbation if an operating point with sufficiently high voltage magnitude is chosen.

Another advantage of the digital optical switch is the power splitting achieved at zero voltage. This is especially important when broadcasting operation is requested, e.g., in some switch matrix applications. FIG. 12 shows a switch matrix structure in which the digital switch is a very attractive choice of switch element. See, R. A. Spanke, "Architectures for Large Nonblocking Optical Space Switches", IEEE Journ. of Quantum Electron., Vol QE-22 (1986), pp 964–967. Here 1×2 switches are needed, which means that the switch described above can be simplified to the structure of FIG. 13 (X-cut case). Here the signal in the incoming single mode channel 131 excites the first order mode of the two mode region 132, and this mode is transformed (as described above) to the output with highest effective index by application of an appropriate electric field via three electrodes 133, 134, 135. The structure of FIG. 12 has good cross-talk properties because a signal must go wrong in two switches before it reaches an unwanted output if the matrix is properly set (this is not true in passive splitting-active combining operation as further explained infra). See, the Spanke article.

The good cross-talk performance of the structure relaxes the cross-talk requirement on the individual switch element, which is very fortunate, because it is probably more difficult to achieve extremely low crosstalk with the digital optical switch than with an electronically adjustable directional coupler such as shown in the Granestrand et al. article.

Another important feature of a switch matrix due to FIG. 12 with digital optical switches as switch elements is the possibility to conveniently implement broadcast functions where the signal from one input is distributed to several outputs. In this case some (or all) of the switches in the first half of the matrix is set to 3 dB power splitting which in the case of the digital optical switch is reached at zero voltage.

A very simple concept to make polarization independent switches is that shown in the Kondo et al. article. This principle sketched in FIG. 14 relies on precise control of the fabrication parameters. The cross over state is implemented at zero voltage by fabrication of the switch 140 so that the $L/l_c$ ratio (physical length to coupling length) is approximately equal to one for both polarizations. The bar (or uncrossed) state is implemented by applying a voltage to one of the electrodes 143 or 144 which puts the TE-mode of the waveguides 141 and 142 (in this Z-cut orientation, corresponding to the weakest of the two relevant r-coefficients) in bar state. If the parameter $a = \Delta\beta_{TE}/\Delta\beta_{TM}$ for a given voltage is between 0.25 and 0.34 the cross-talk will be below $-20$ dB because of the approximate coincidence of the first bar state for the T mode and the third bar state for the TE mode.

A way to reduce the high voltage length product of polarization independent switches is to make use of another r-coefficient namely $r_{51}$ or $r_{42}$ (131, 232 in non-contracted notation). See, the Pohlmann et al. article. These r-coefficients perform TE-TM conversions and have approximately the same magnitude as $r_{33}$. Because these coefficients couple modes which see different indices (ordinary and extraordinary) periodic phase matching electrodes are needed. These cannot be as effective as normal electrodes. Therefore this kind of switch does not get as low voltages as is indicated by the magnitude of the r-coefficient. However, they can be more voltage efficient than other principles for polarization independent switches. Devices with this kind of electrodes are quite temperature sensitive and complex. Further, if this principle is to be applied to a directional coupler, the suppression of, or alternatively interaction with, the normal interwaveguide coupling is quite cumbersome. Alternatively, it can be used in a balanced bridge-modulator. However, even in this case fabrication is relatively difficult, since polarization independent 3 dB couplers are required in "non-isotropic" (not Z-propagating) propagation directions. Recently, an alternative using polarization splitting has been demonstrated which may be easier to fabricate. See, T. Pohlmann, et al., "Polarization independent switches in LiNbO$_3$," Proceedings of the Topical Meeting on Integrated Photonics Research, Hilton Head, S.C., 1990, pp. 38–39.

In the Granestrand article an electronically adjustable polarization independent switch is described. However, even in this concept the fabrication tolerances (in terms of permitted combinations of $L/l_c$ ratios for the two polarizations) are smaller than desired (this holds for cross state implementation, bar state implementation has no requirement on the $L/l_c$ ratios).

Each of the couplers described above suffer drawbacks such as complex fabrication, elaborate implementation and/or control and undue sensitivity to the environment.

SUMMARY OF THE INVENTION

The present invention involves principles for polarization independent switches including a directional coupler with extremely relaxed fabrication tolerances.

The present invention employs polarization independent $LiNbO_3$ components that are designed in such a way that the inherent polarization dependency of the material can be circumvented.

The present invention achieves these objects with a polarization independent switch or coupler including a mono-crystalline wafer of electro-optic material at least with two closely adjacent light waveguides at an upper surface along with electrodes positioned adjacent the waveguides. The electrodes include a grounded, main electrode formed on one side of the waveguides and four smaller electrodes formed in a line on a opposite side or sides of the waveguides, each of the four smaller electrodes being supplied with a voltage. When the voltages applied to the middle two electrodes have equal values and have like polarity ($V_c = V_b$) and the voltages applied to the outer electrodes have equal values and like polarity ($V_d = V_a$), the light travelling in one waveguide is barred from transferring to the other waveguide. When the voltages applied to the middle electrodes have equal value but opposite polarity ($V_c = -V_b$) and the voltages applied to the outer electrodes have equal value but opposite polarity ($V_d = -V_a$), the light travelling in one waveguide crosses to the other waveguide.

BRIEF DESCRIPTION OF THE DRAWINGS

The invention will now be described in detail with reference to the drawings wherein:

FIG. 6b is a side view of the electrode and voltage arrangement of the switch shown in FIG. 6a;

FIG. 6c illustrates a switch diagram for the switch shown in FIG. 6a;

FIG. 15 represents a Z-cut, Y propogating polarization independent directional coupler in accordance with the present invention;

FIGS. 17a–17q are graphs of normalized drive voltages for different $L/l_c$ values for the switch shown in FIG. 15;

FIG. 18 represents a stacked waveguide, polarization independent directional coupler in accordance with the present invention;

FIG. 19 represents a stacked waveguide, polarization independent directional coupler in accordance with the present invention.

DESCRIPTION OF THE PREFERRED EMBODIMENTS

Figure 1:
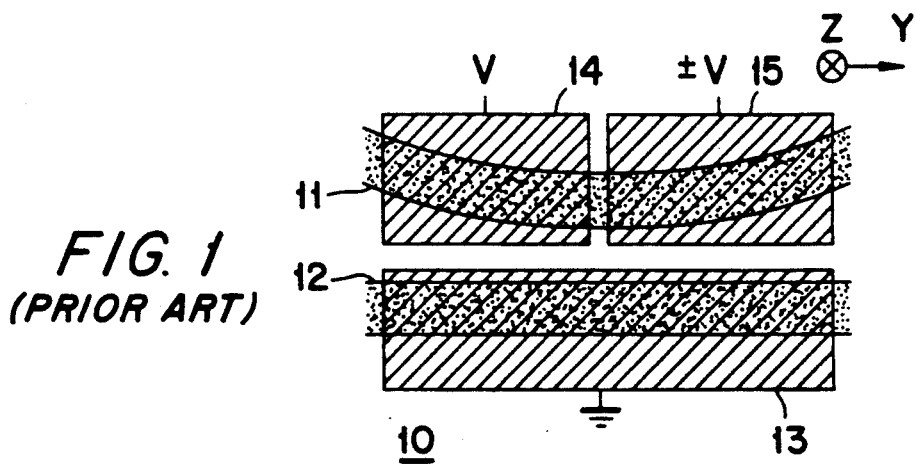
FIG. 1 represents a conventional polarization independent electro-optical switch.
Figure 3:
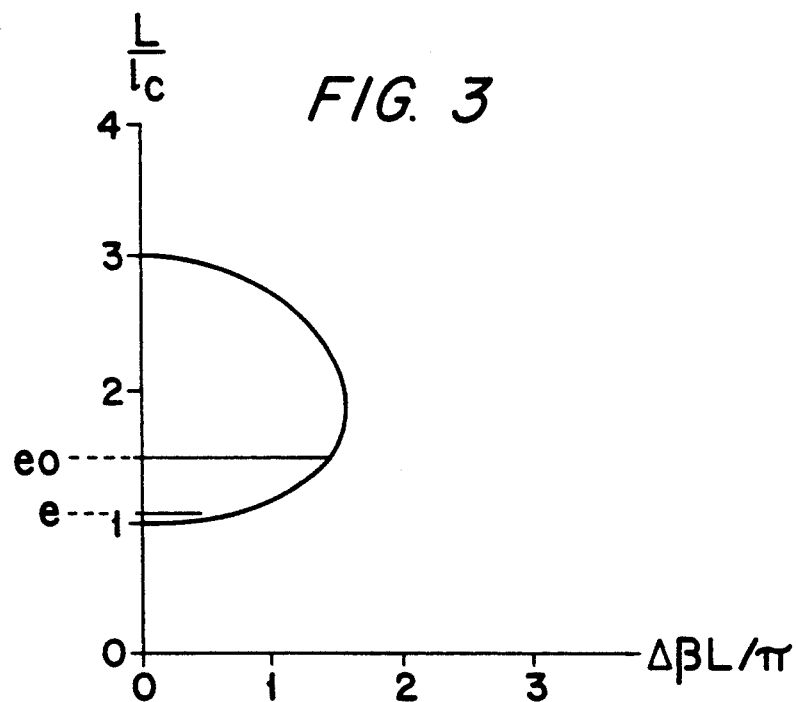
FIG. 3 illustrates a switch diagram for a cross state of the conventional coupler shown in FIG. 1.
Figure 4:
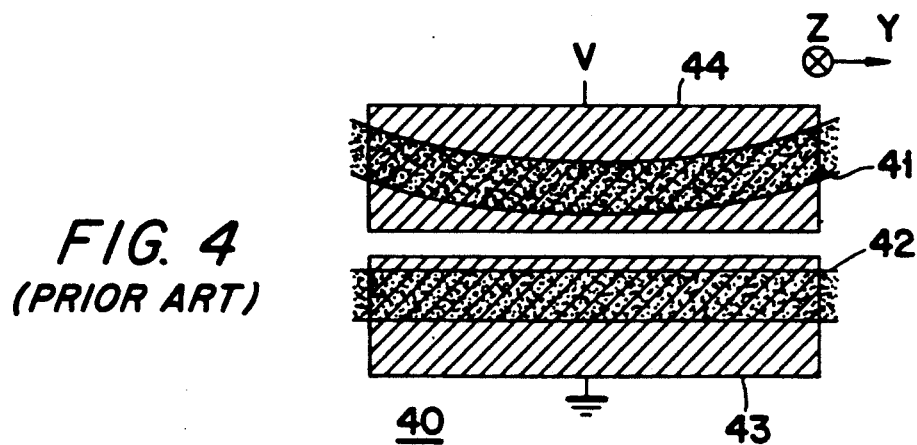
FIG. 4 represents another conventional electro-optical switch.
Figure 2A:
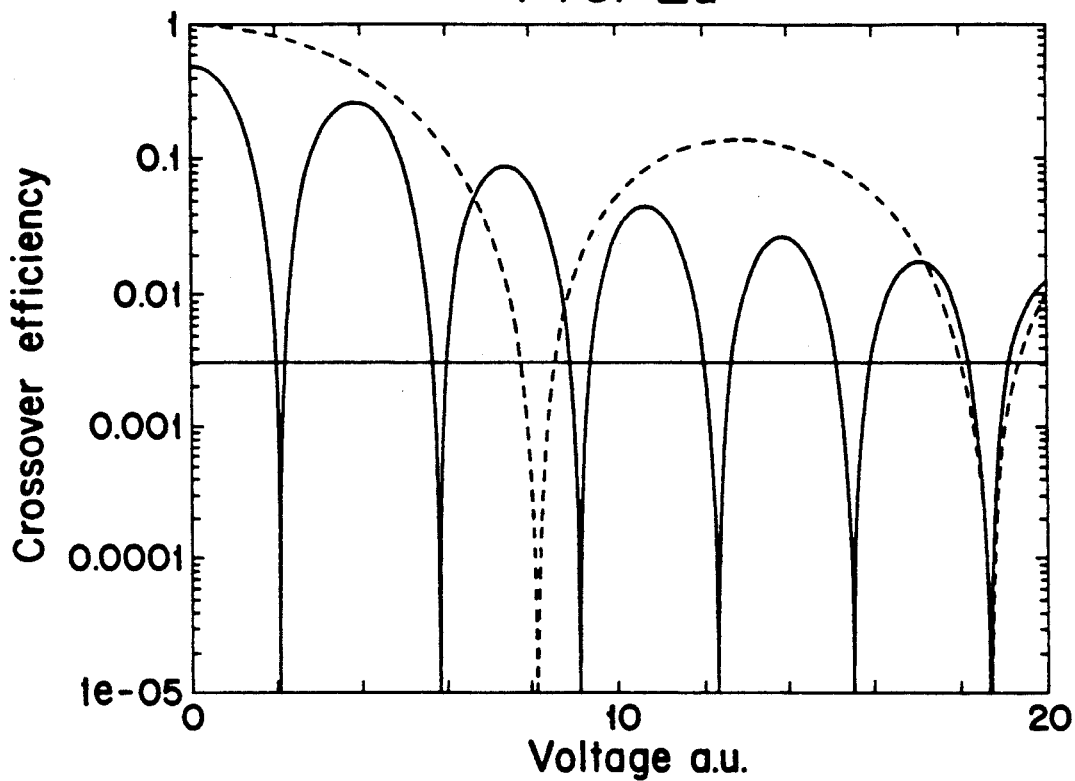
FIGS. 2a and 2b are graphs of the transfer function for a uniform $\Delta\beta$ operation of the conventional directional coupler shown in FIG. 1.
Figure 2B:
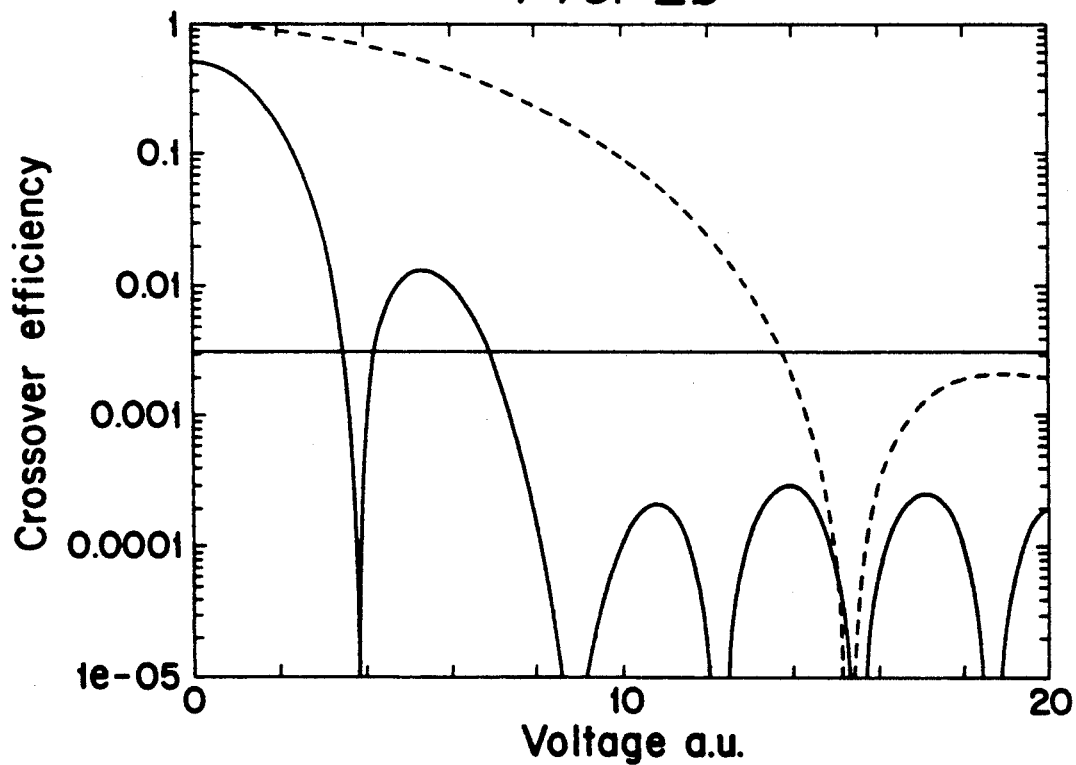

When optical switches in $Ti:LiNbO_3$ are fabricated, a crystal orientation is usually selected which makes possible use of the strongest electro-optic r-coefficient ($r_{33}$ in contracted index notation, 333 non-contracted notation) corresponding to a change in the refractive index in the Z-direction due to an applied field in the Z direction. These orientations are Z-cut, X or Y propagating, Y-cut, X-propagating and X-cut, Y-propagating. As an example, Z-cut, Y-propagating means that the light channels are aligned so that propagation is mainly in the Y-direction in the crystal and that the surface is perpendicular to the Z-axis. In these orientations the Z-axis is perpendicular to the propagation direction.

There are two main reasons for the polarization dependency of integrated optical circuits in these orientations. First, the index perturbations due to in-diffusion of titanium (Ti) are different for the extraordinary (corresponding to Z-axis direction) and ordinary indices. This means that different waveguides are formed for the TE- and TM- polarizations respectively. As a result of this, the coupling coefficient between coupled waveguides in, e.g., a directional coupler, will be different for the two polarizations. Usually this difference makes the mode corresponding to the extraordinary index more confined than the mode corresponding to the ordinary index. With specific fabrication conditions it is possible to get almost the same coupling coefficients for both polarizations. However, this leads to modes which are less confined than what is usually desired.

The second reason for the polarization dependency is the different electro-optic coefficients seen by the two polarizations; the "extraordinary" mode "sees" $r_{33}$ and the "ordinary" mode "sees" $r_{13}$. The electro-optic coefficient $r_{13}$ is approximately a factor of 3 less than $r_{33}$. This means that the index perturbations due to applied electrode voltages will be different for the two polarizations, which means that in general different drive voltages are required for the two polarizations, even if the coupling lengths are equal.

When different principles for polarization independent switches are compared a number of aspects must be considered. Two aspects are fabrication tolerances and cross-talk, these are usually strongly correlated; if "perfect" fabrication was possible, very good cross-talk ("perfect" in coupled wave approximation) should result with most principles. However, with realistic fabrication tolerances the cross-talk performance differ significantly between different principles. Another aspect is bandwidth, both instantaneous bandwidth (corresponding to maximum bitrate of a signal routed through the switch) and total bandwidth (corresponding to the total wavelength region possibly containing many channels which can be switched simultaneously). Further, the drive complexity (number of drivers, tolerance of voltages) should be considered.

Another important aspect is the drive voltage and tolerance for drive voltages variations. This tolerance is closely related to another even more important property, namely the stability performance. If the switch states are relatively insensitive to a variation of the drive voltages in the vicinity of the operation point the switch also has good stability performances because the effect of temperature variations, for example, manifests as a variation of the "effective" voltage.

When drive voltage is considered in general polarization independent switches need drive voltages a factor of approximately 3–5 times higher than polarization dependent ones (except for principles utilizing $r_{51}$ or $r_{42}$). If more complex structures (containing a number of switch elements) are needed, the chip size limitations will impose use of relatively short switches, which inherently require higher drive voltages (there is usually a voltage length product which is constant for the switch elements). Since it is impractical to supply high voltages at very high speed, this means that polarization independent switches, at least when a number of switches need to be integrated on one chip, are of practical use mainly in low and moderate switching speed applications (below 100 MHz).

FIG. 15 illustrates an electro-optic directional coupler with four sections of electrodes for $\Delta\beta$ modulation which takes into account the considerations listed above. In FIG. 15, a mono-crystalline wafer 150 of electro-optic material such as lithium niobate or lithium tantalate. At its upper surface 158, the wafer 150 has formed upon it at least two light waveguides 151 and 152, which can be made by diffusing titanium into the surface 158 of the wafer 150. This embodiment represents a Z-cut version of a LiNbO$_3$ optical switch having waveguides are substantially aligned with the Y axis of the semiconductor substrate. The waveguides have inputs 151a and 152a at one plane end surface of the wafer 150 and outputs 151b and 152b.

The two waveguides 151 and 152 form an interaction region of length L where the two waveguides 151 and 152 are closely adjacent and substantially parallel to one another. A light wave entering one of the inputs 151a or 152a via a optical fiber, for example, may be distributed between the outputs 151b and 152b. This is done by coupled electromagnetic oscillations occurring between the waveguides 151 and 152 along their interaction length L.

The degree of coupling between waveguides may be selected by selecting the distance d between them. Variation of the coupling length $l_c$ is thus enabled, this being the length along the interaction length L required for a light wave in one waveguide to be completely switched over to the other waveguide. The distance d can be adjusted so that the coupling length $l_c$ coincides with the length L of the interaction length, a light wave coming into the input of one waveguide being then sent out from the output of the other waveguide. The degree of coupling between the waveguides may be affected by the refractive index of the crystal being changed by an electric field E applied between electrodes 153–157 along the interaction length L.

The field strength can be selected such that the coupling between the waveguides ceases, whereby a light wave entering at the input of one waveguide is sent from the output of the same waveguide. As mentioned above, there is the desire here of being able to steer the incoming lightwave between the outputs of the directional coupler independent of the polarization state of the light wave. It is also a desire that the directional coupler will be simple and will allow the incoming light wave to have high pulse frequency.

Electrodes 153–157 are positioned along the interaction length L of the two waveguides 151 and 152. The electro-magnetic field E is established upon application of selected voltages to the electrodes. A main electrode 153 is formed substantially parallel to the two waveguides 151 and 152 on one side of the waveguides. The main electrode 153 is grounded by an appropriate electrical connection and may be formed as two or more electrodes, as represented by phantom lines in FIG. 15. A first electrode 154 is formed on a side of the waveguides 151 and 152 opposite to the main electrode 153. The first electrode 154 is connectable to a first voltage source $V_a$. The voltage source $V_a$ creates a potential in the first electrode 154 wherein the potential is adjustable by circuitry not shown.

A second electrode 155 is formed on the same side of the waveguides 151 and 152 as the first electrode and is positioned adjacent to the first electrode 154. The second electrode 155 is connected to a second voltage source $V_b$, the output of which is changeable. A third electrode 156 is formed beside the second electrode 155 and is connectable to a third voltage source $V_c$, the output of which is changeable. A fourth electrode 157 is formed adjacent to the third electrode 15 and is connectable to a fourth voltage source $V_d$, the output of which is also changeable.

The four electrodes 154–157 are arranged in line or row parallel to the main electrode 153 and the composite length of the four electrodes 154–157, with spaces in between the electrodes, is approximately equal to the length of the main electrode 153, which is approximately equal to the interaction length L.

The formation of the electrodes 154–157 in the waveguides may be accomplished by conventional methods, such as the photo lithographic method. With the voltage sources $V_a$–$V_d$ connected, a main electrical field E is established through the crystal wafer between the electrodes and passes through the waveguides to affect their refractive index. Each of fields due to the individual electrodes 153–157 affect the main electric field and the resulting electric field E may be adjusted by selectively changing the voltage to each of the electrodes 154–157.

The coupling degree between the wave guides 151 and 152 may be affected by the electric field E in the crystal. The electric field E changes the shape of the refractive index ellipsoid due to Pockel's effect for weak electric fields. It should be noted that the index perturbations may be due to effects other than the electro-optical effect (Pockel's effect), such as due to carrier effects in the semiconductor material. The change is described in the most general three dimensional case by a third rank tensor with 27 tensor elements. These are usually denoted $r_{ijk}$ where the indices i, j and k may assume the values 1, 2 or 3. The indices refer to a right-angular right-hand coordinate system with axes $x_1$, $x_2$ and $x_3$. The $x_1$ axis is parallel to the upper surface 158 and at right angles to the waveguides 151 and 152, the $x_2$ axis is at right angles to the upper surface 158 and the $x_3$ axis is parallel to the waveguides 151 and 152. The tensor elements $r_{ijk}$ have the physical dimensions of length per electrical potential difference (meters per volt), which is a measure of the change in coupling degree between the oscillation modes achieved by the electrical field.

When the outputs of the second and third voltage sources $V_b$ and $V_c$ have equal and like polarity, and the outputs of the first and fourth voltage sources $V_a$ and $V_b$ have an equal value and like polarity ($V_b = V_c$ and $V_a = V_d$), the light travelling in one waveguide is barred from transferring to the other waveguide thereby establishing the bar state. When the outputs of the second and third voltage sources $V_b$ and $V_c$ have equal value and opposite polarity, and the outputs of the first and fourth voltage sources $V_a$ and $V_d$ have equal value and opposite polarity ($V_c = -V_b$ and $V_d = -V_a$) the light travelling in one waveguide crosses to the other waveguide thereby establishing the cross state. As can be seen, the drive voltages $V_a$, $V_b$, $V_c$ and $V_d$ are driven with two degrees of freedom.

The possibility to trim "perfect" switch states in a conventional (single polarization) directional coupler with possible $L/l_c$ variations are associated with a longitudinally symmetrical and antisymmetrical (round the switch center) $\Delta\beta$ modulation for the bar and cross states respectively. It is assumed that two degrees of freedom are needed to make the polarization independent directional coupler continuously adjustable. The structure of FIG. 15 has the capacity of four degrees of freedom because it has a main electrode and four electrodes with independently adjustable voltage sources. When the first and fourth, and second and third electrodes are electrically coupled, the structure shown in FIG. 15 has two degrees of freedom.

For the bar state implementation, the voltages $V_c$ and $V_d$ are chosen as $V_d = V_a$ and $V_c = V_b$. This gives a longitudinally symmetrical $\Delta\beta$ modulation (index perturbation as a function of longitudinal coordinate is an even function) around the switch center. By proper adjustment of these two voltages ($V_a$ and $V_b$) perfect bar state implementations are possible (in coupled wave analysis limit).

For the implementation of the cross state, voltages $V_c$ and $V_d$ are chosen as $V_d = -V_a$ and $V_c = -V_b$. This gives a longitudinally antisymmetrical $\Delta\beta$ modulation around the switch center, and can be regarded as an extension of the stepped $\Delta\beta$ reversal coupler. See, H. Kogelnik et al., "Switched Directional Couplers With Alternating 1,3 ", IEEE Journal Quantum Electron., Vol QE-12 (1976), pp 396–401.

Figure 16:
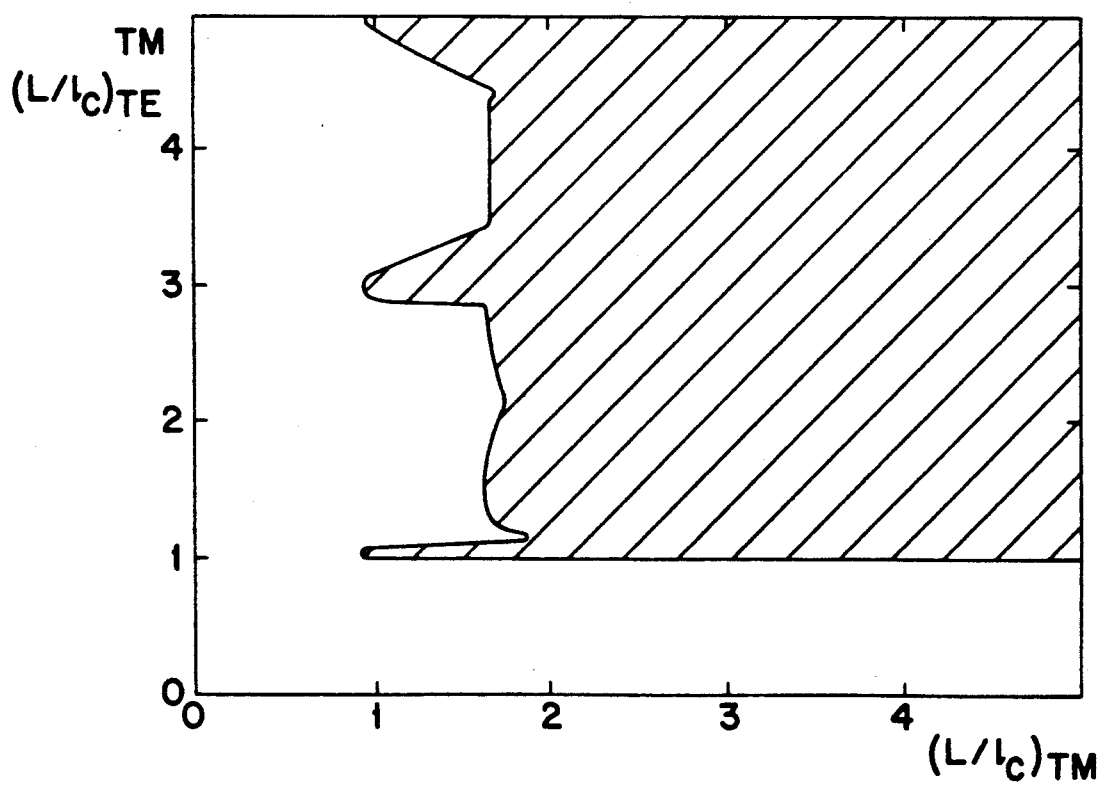
FIG. 16 is a graph of the limits for $L/l_c$ for the for two polarizations within which it is possible to get less than −20 dB cross-talk in a cross state.

In FIG. 16 the limits for $L/l_{c,eo}$ and $L/l_{c,o}$ (eo and o here means extraordinary and ordinary polarizations respectively) within it is possible to get a cross state better than −20 dB for both polarizations simultaneously (calculated with coupled wave theory). The calculation is performed by varying the two free parameters $V_a$ and $V_b$ for each combination of $L/l_c$ while checking if the cross-talk requirement can be fulfilled. As can be seen, the permitted region is very large.

Figure 5:
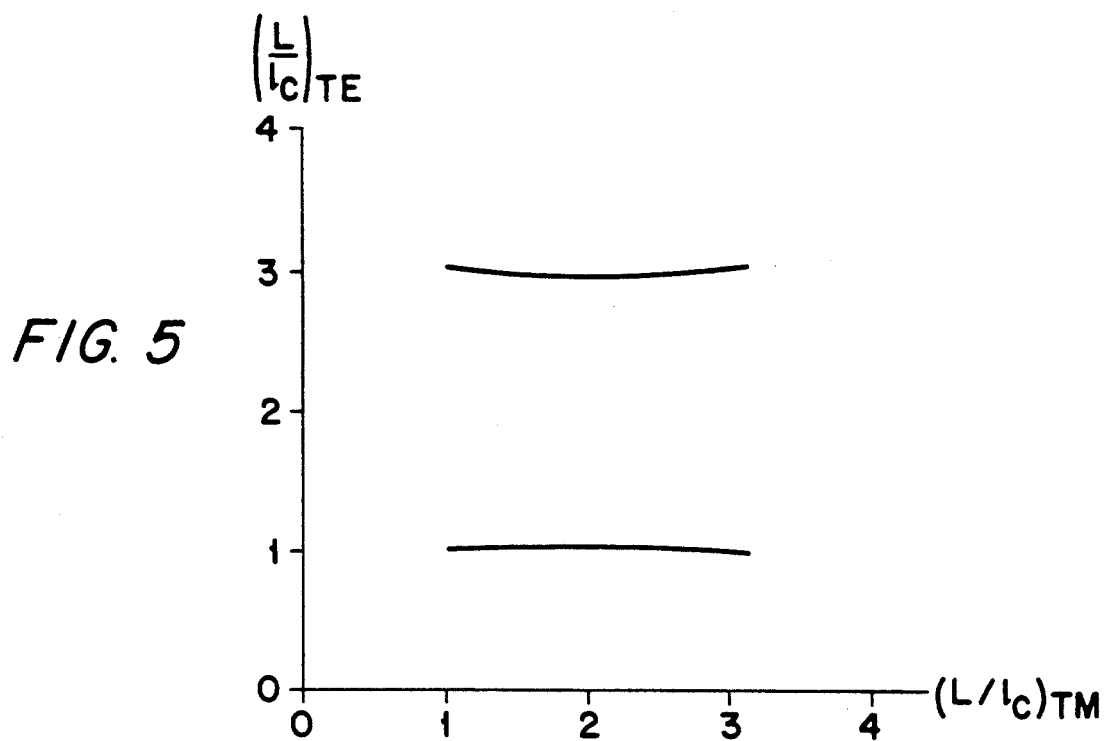
FIG. 5 is a graph of permitted L/1c combinations to get "perfect" cross-talk in a cross state of the switch of FIG. 1.
Figure 6A:
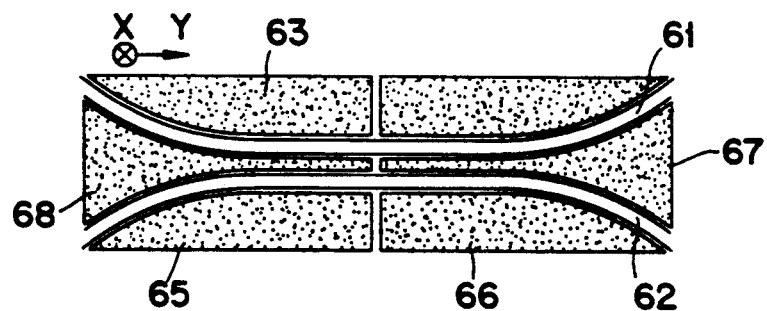
FIG. 6a represents another conventional electro-optic switch.
Figure 6B:
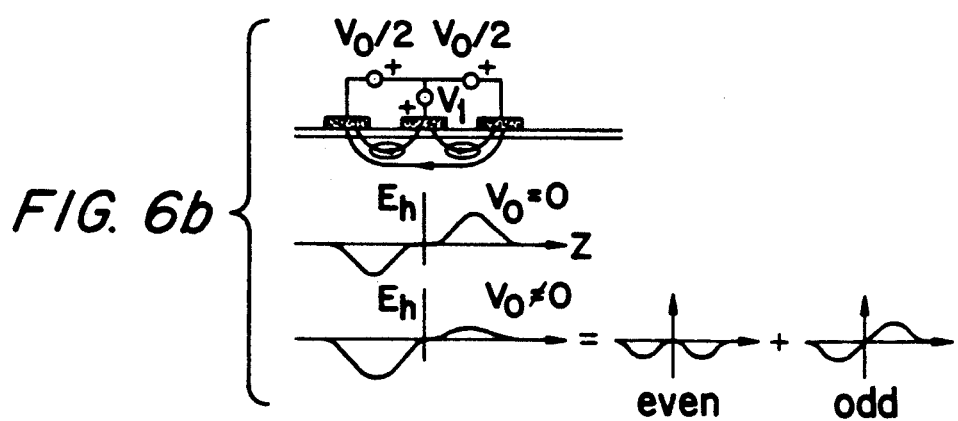
Figure 6C:
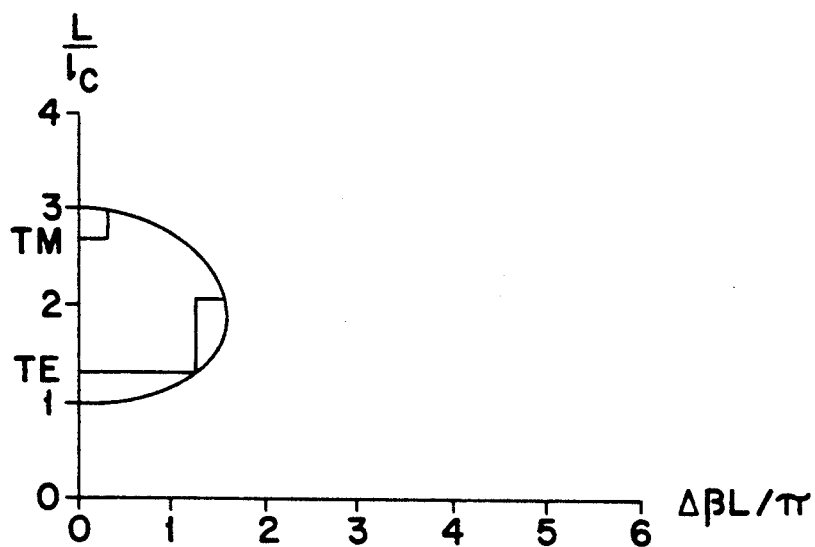
Figure 6D:
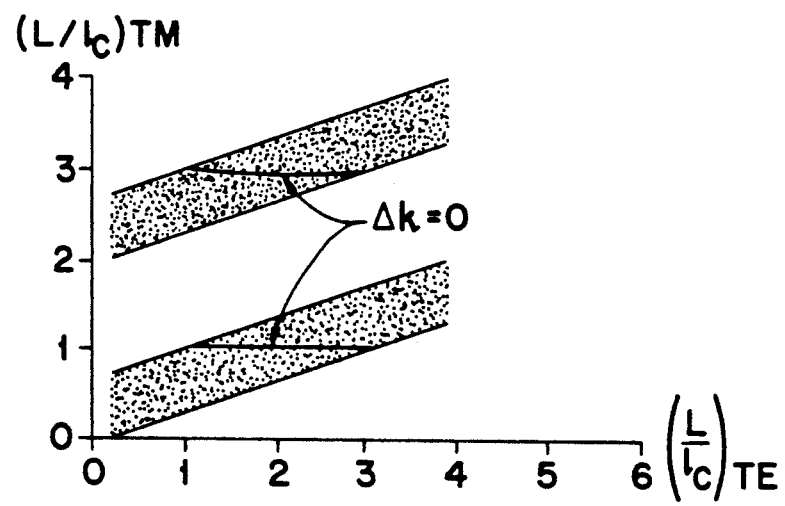
FIG. 6d is a graph of the limits of $L/l_c$ for the two polarizations within which it is possible to get a "perfect" cross state.
Figure 6E:
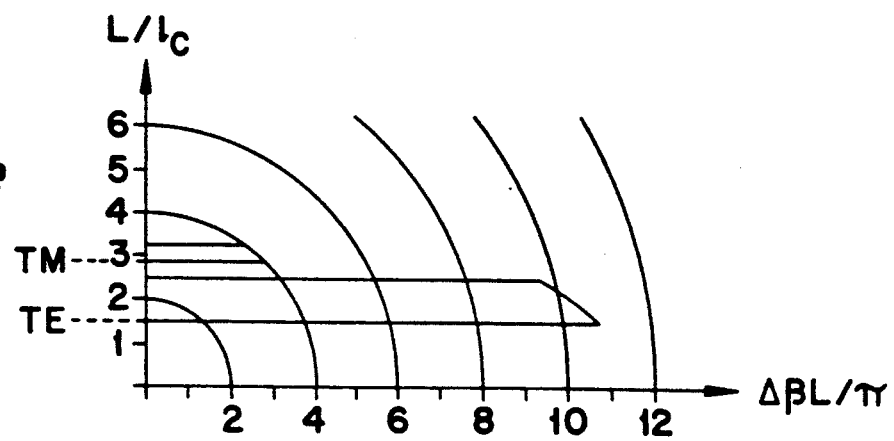
FIG. 6e is a graph illustrating both $\Delta\beta$ and $\Delta\kappa$ modulation to get a "perfect" bar state.
Figure 6F:
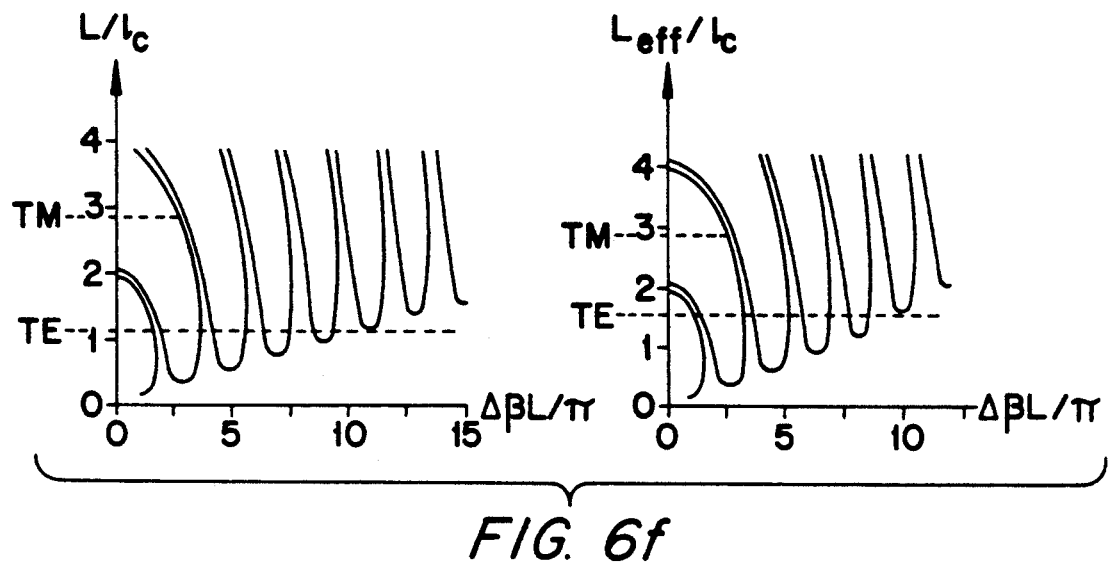
FIG. 6f are bar state switch diagrams contours for −20 dB cross-talk illustrating the effect of the circular bends at the input and output of a directional coupler.
Figure 7A:
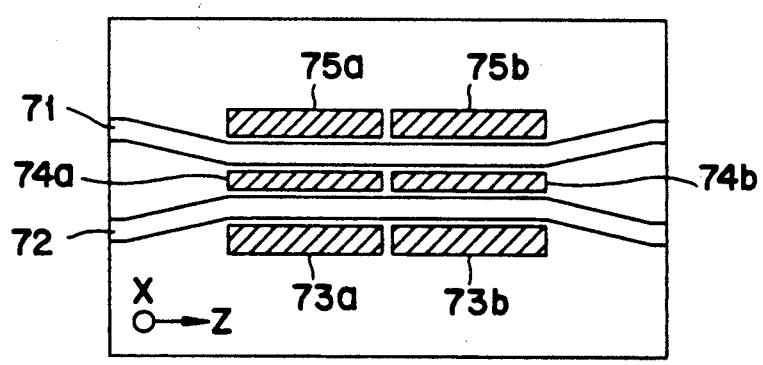
FIGS. 7a and 7b represent a top and a cross-sectional view of a conventional directional coupler in a Z-propagating orientation.
Figure 7B:
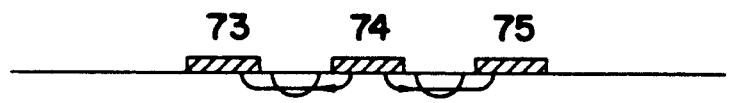
Figure 8A:
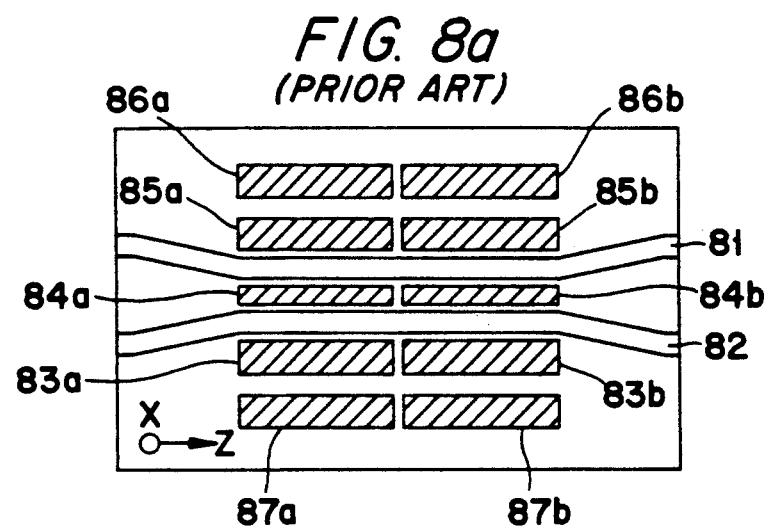
FIGS. 8a and 8b represent a top and a cross-sectional view of a conventional Z-propagating directional coupler with an extra electrode.
Figure 8B:
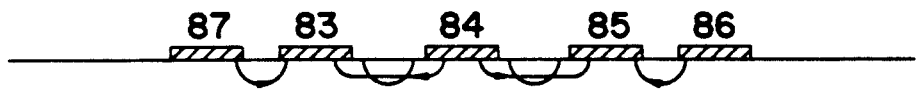
Figure 9:
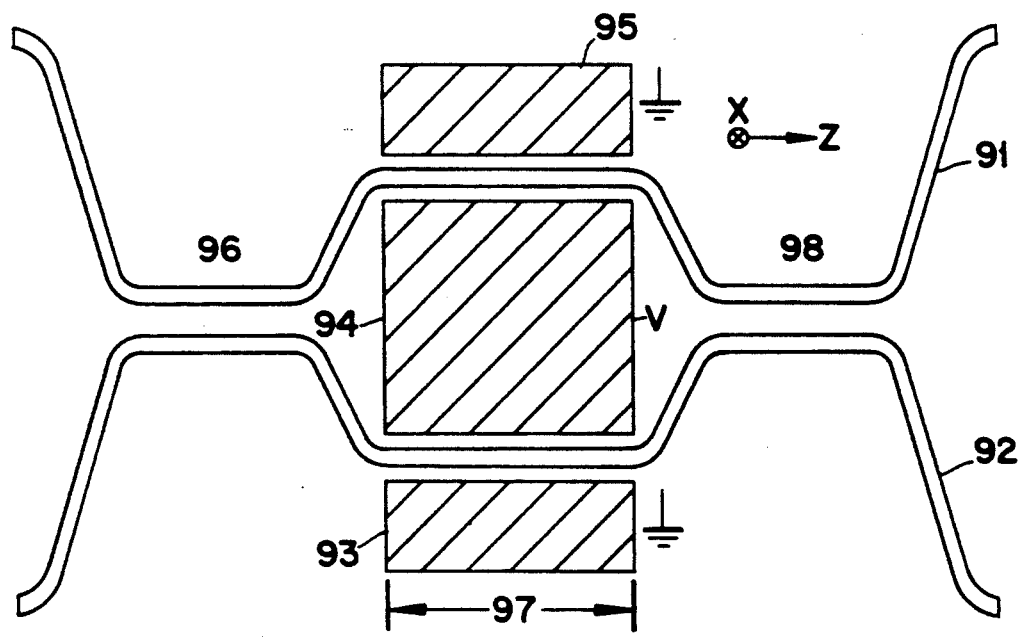
FIG. 9 represents a polarization independent balanced bridge interferometer in Z-propagating $LiNbO_3$.
Figure 10:
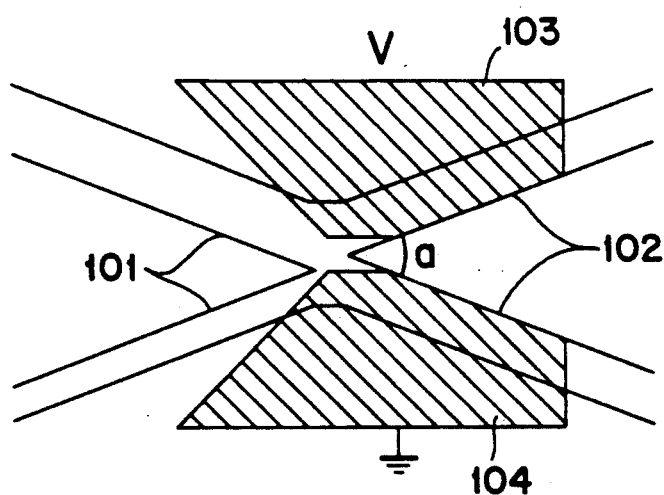
FIG. 10 represents a conventional digital optical 2×2 switch.
Figure 11:
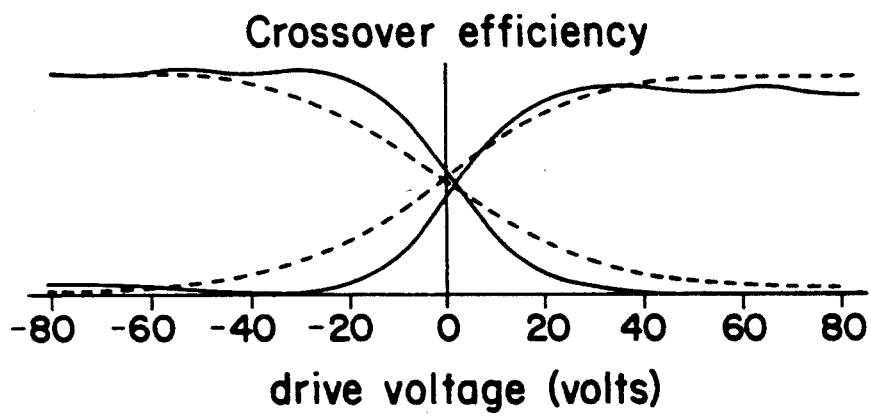
FIG. 11 is a graph of an experimental transfer function for a digital optical switch.
Figure 12:
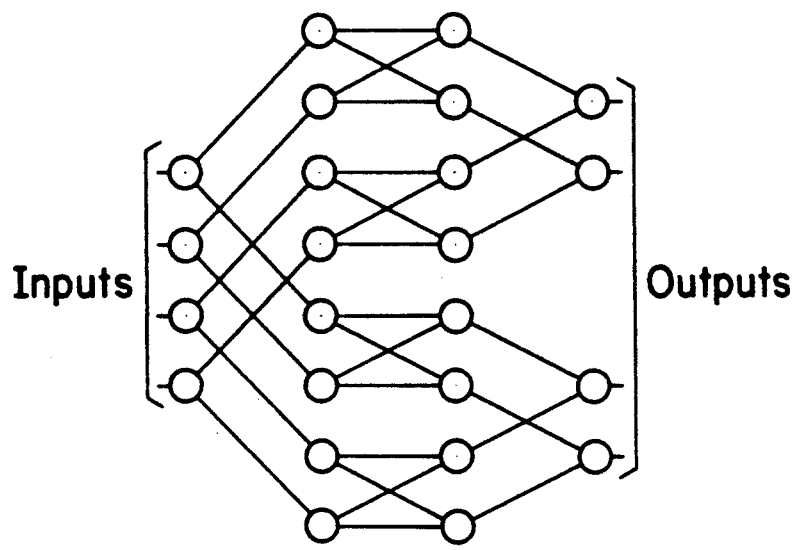
FIG. 12 represents a switch tree structure.
Figure 13:
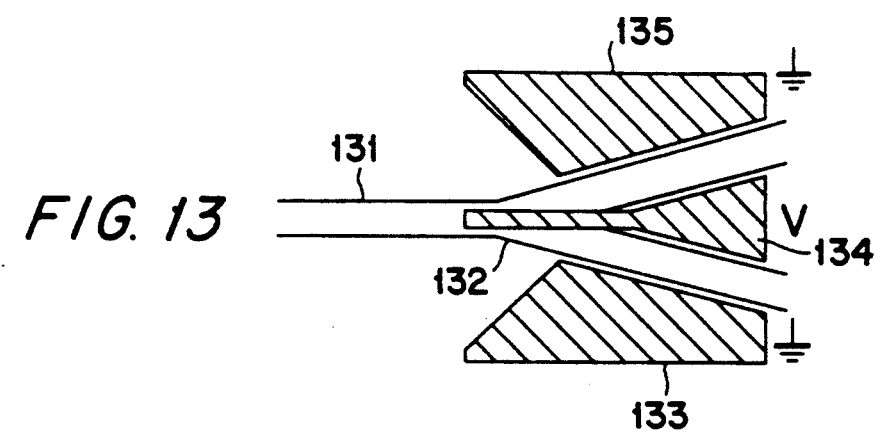
FIG. 13 represents a 1×2 digital optical switch used in the tree structure shown in FIG. 12.
Figure 14:
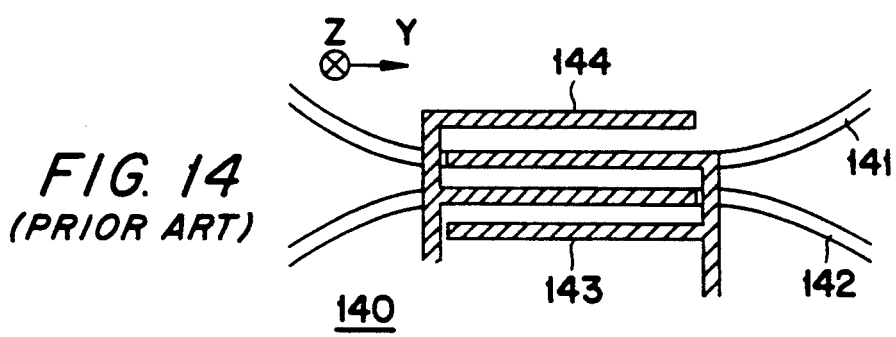
FIG. 14 represents a conventional polarization independent directional coupler.

With this kind of switch, the fabrication tolerances, in terms of permitted coupling length combinations, are even larger than for a conventional polarization dependent stepped $\Delta\beta$ reversal directional coupler (can be understood by comparing FIGS. 5, 6d and 16). For the bar state, a corresponding figure would show no limits.

Figures 17F, 17G, 17H, 17I, 17O, 17P, 17Q:
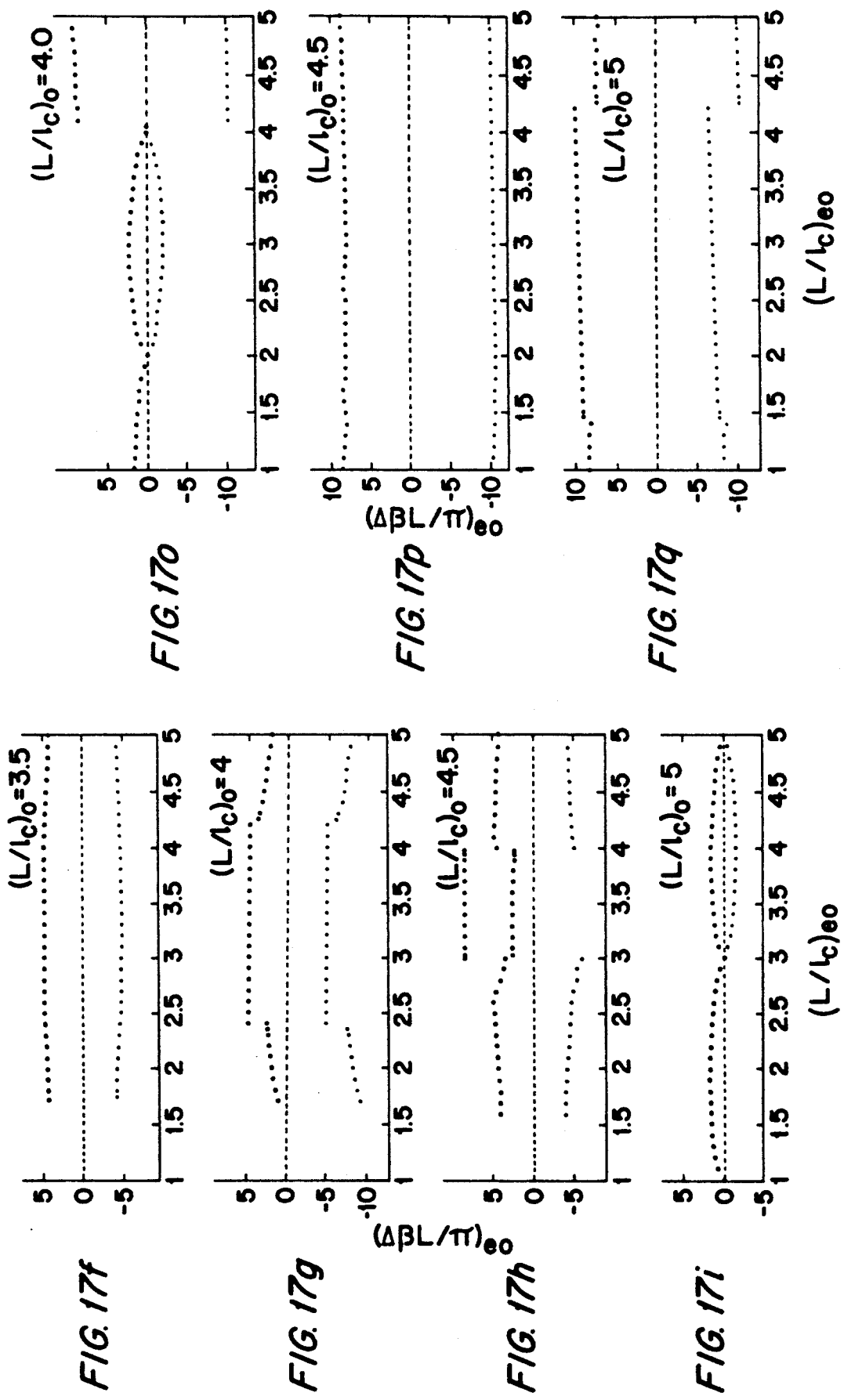

In FIG. 17 normalized drive voltages are plotted for different $L/l_c$ combinations. The horizontal axis represent the $L/l_c$ for extraordinary index polarization and the parameter in the different plots is $L/l_c$ for the ordinary polarization. The vertical axis represents $\Delta\beta L/\pi$ for extraordinary polarization and the value for the ordinary polarization is set to 30 percent of this value in the calculations. The left half of FIG. 17 corresponds to the cross state where $V_c = -V_b$ and $V_d = -V_a$. The right half of FIG. 17 corresponds to the bar state where $V_c = V_b$ and $V_d = V_a$. The boxes or dots correspond to the first electrode 154 and the +symbols correspond to the second electrode 155.

When required drive voltages are compared with other switches, this switch does quite well. The drive voltages of course depend on the combination of $L/l_c$ for the switch, making a comparison somewhat cumbersome, but in general the cross state voltages are higher and the bar state voltages are lower for this switch than for, e.g., switches shown in the Ramer et al., and Kondo et al. articles since in these switches the bar state voltages generally are much higher than the cross state voltages. This means that the proposed switch often will give lower "maximum required voltage" than the previous concepts.

An alternative embodiment of the present invention is shown in FIG. 18 and includes placing a first set of four electrodes 181a–181d (to which voltage is applied) on a top side of a first waveguide (or channel) 182, a grounded, main electrode 183 on an side of the first waveguide 182 opposite to the first four electrodes 181a–181d (i.e., below the first waveguide 182). A second waveguide 184 is located on an opposite side of (i.e., below) the grounded, main electrode 183, and a second set of four electrodes 185a–185d placed on an side of the second waveguide 184 opposite to said main electrode 183 (i.e., below the second waveguide 184). The main electrode 183 serves the duel function of a conductive electrode and a coupling region between the waveguides. This combination of elements forms a vertically stacked structure of four electrodes, a waveguide, a main electrode, another waveguide and four more electrodes in the order recited.

The embodiment of FIG. 18 assumes that electrodes 181, 183, 185 placed between, over and under the waveguides (or channels) 182, 184 can be accessed by electrical connections. This embodiment also means that the regions between the waveguides serve both as evanescent field coupling regions and as electrodes. The dopant level of this region must be carefully selected to balance a tradeoff between electrical conductivity of the electrode and isolation to prevent excessive optical losses in the coupling function.

In operation, the embodiment of FIG. 18 is similar to the operation of the optical coupler shown in FIG. 15. With reference to FIG. 18, this polarization independent directional coupler includes a mono-crystalline wafer 180 of electro-optic material upon which are formed at least two light waveguides 182, 184 at an upper surface of the wafer 180. These waveguides 182, 184 form an interaction region in the main electrode 183 where the waveguides 182, 184 are closely adjacent and substantially parallel to one another. Electrodes 181, 183, 185 positioned along said interaction region of the waveguides 182, 184 include a main electrode 183 formed substantially parallel to and between the waveguides 182, 184, the main electrode 183 being electrically grounded and functioning as a coupling region between the waveguides 182, 184. Each of a first set of four electrodes 181a-181d aligned in a row substantially parallel to the top side of the waveguides 182, 184 opposite to the main electrode 183 are connectable to a variable outputs $V_a-V_d$ of a voltage source or sources. Each of a second set of four electrodes 185a-185d (aligned in a row substantially parallel to a side of the waveguides 182, 184 opposite to the main electrode 183 and the first set of electrodes 181a-181d) are connectable to a variable outputs $V_a-V_d$ of a voltage source or sources. When the voltages applied to the middle two electrodes 181b, 181c; 185b, 185c of the first and second sets of electrodes have equal value and like polarity, and the voltages applied to the outer electrodes 181a, 181d; 185a, 185d of the first and second sets of electrodes have equal value and like polarity, the light travelling in one waveguide is barred from transferring to another waveguide. When the voltages applied to the middle two electrodes 181b 181c; 185b, 185c of the first and second sets of electrodes have equal value and opposite polarity, and the voltages applied to the outer electrodes 181a, 181d; 185a, 185d of the first and second sets of electrodes have equal value and opposite polarity, the light travelling in one waveguide is barred from transferring to another waveguide, the light travelling in one waveguide crosses to another waveguide.

Like the earlier embodiment, the wafer 180 can be an electro-optic material of a polarization dependent material such as LiNbO₃. Also, the composite length of each of the first and second sets of electrodes 181, 185 is approximately equal to the length of the main electrode 183 as before.

FIG. 19 shows yet another embodiment of the invention having a stacked waveguide relationship. A first waveguide 191 is positioned above a coupling region 196 under which a second waveguide 194 is positioned in a stacked relationship. On one side of the waveguides 191, 194 and the coupling region 196 is a grounded, main electrode 193 (though the main electrode 193 may be optionally omitted adjacent the coupling region 196). On a side opposite to the main electrode 193 of the stacked structure appear two sets of four electrodes 191a-191d and 195a-195d, each set being substantially contiguous with the side of the first and second waveguides 191 and 194.

In operation, the embodiment shown in FIG. 19 is similar to the operation of the embodiment shown in FIG. 15. Referring to FIG. 19, the coupler includes a mono-crystalline wafer 190 of electro-optic material such as LiNbO₃. At least two light waveguides 194, 197 on the wafer 190 form an interaction region where the waveguides 194, 197 are closely adjacent and substantially parallel to one another in a stacked relationship. Electrodes 191, 193, 195 are positioned along the interaction region 196 of the waveguides 194, 197. The main electrode 193 is formed substantially parallel to and on one side of the waveguides 194, 197 and is grounded. The main electrode 193 can include more than one separate electrode. Each of a first set of four electrodes 191a-191d aligned in a row along a side of one of the waveguides 197 opposite to main electrode 193 is connectable a variable output of a voltage source or sources. Each of a second set of electrodes 195a-195d aligned in a row along a side of another of the waveguides 194 opposite to the main electrode 193 and adjacent to the first set of electrodes 191 are connectable to a variable output of a voltage source or sources. The composite length of the first and second sets of electrodes 191, 195 is approximately equal to the length of the main electrode 193.

When the voltage applied to the middle two electrodes 191b, 191c; 195b, 195c of the first and second set of electrodes have equal value and like polarity and the voltage applied to the outer two electrodes 191a, 191d; 195a, 195d of the first and second sets of electrodes have equal value and like polarity, the light travelling in one waveguide is barred from transferring to another waveguide. When the voltage applied to the middle two electrodes 191b, 191c; 195b, 195c of the first and second set of electrodes have equal value and opposite polarity and the voltage applied to the outer two electrodes of said first and second sets of electrodes 191a, 191d; 195a, 195d have equal value and opposite polarity, the light travelling in one waveguide crosses to another waveguide.

As can be seen from above, in the embodiments of optical coupler shown in FIGS. 18 and 19, where the electrodes are formed on the side walls of the waveguides, Δβ modulation can be performed using index perturbations induced by an electro-optical effect (Pockel's effect), or other effects such as carrier effects in the semiconductor material.

It should be noted that the area adjacent the stacked waveguide structure in FIGS. 18 and 19 may be air, vacuum or regrown semiconductor material.

Figure 20:
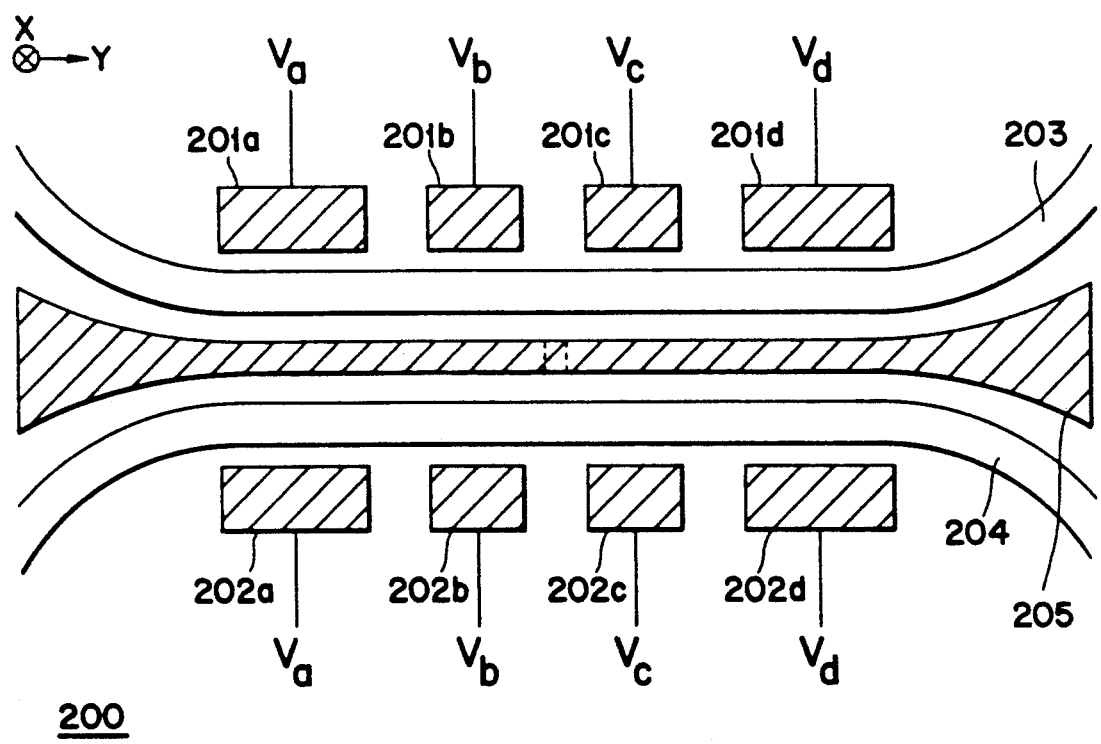
FIG. 20 represents a X-cut, Y propagating polarization independent directional coupler in accordance with the present invention.

FIG. 20 illustrates yet another embodiment of the present invention. The operation of the optical coupler shown in FIG. 20 is analogous to the optical coupler shown in FIG. 15. However, there are some structural differences between the two embodiments. In general terms, the embodiment shown in FIG. 20 is an X-cut version of the LiNbO₃ switch shown in FIG. 15.

The embodiment of FIG. 20 involves two waveguides 203 and 204 positioned side by side on the substrate along Y crystal orientation. Positioned between the waveguides is a grounded, main electrode 205. On either side of combined structure of the waveguides 203, 204 and main electrode 205 structure are two sets of four electrodes 201a-201d and 202a-202d. Voltages $V_a-V_d$ are selectively applied to the electrodes, preferably with magnitudes symmetric with relation to the pairing of the electrodes 201a-201d, 202a-202d position opposite to each other.

In operation, the embodiment of FIG. 20 is similar to the operation of the optical coupler shown in FIG. 15. With reference to FIG. 20, this polarization independent directional coupler includes a mono-crystalline wafer 200 of electro-optic material upon which are formed at least two light waveguides 203, 204 at an upper surface of the wafer 200. These waveguides 203, 204 form an interaction region under the main electrode 205 where the waveguides 203, 204 are closely adjacent and substantially parallel to one another. Electrodes 201, 202, 205 positioned along said interaction region of the waveguides include a main electrode 205 formed substantially parallel to and between the waveguides 203, 204, the main electrode 205 being electrically grounded. Each of a first set of four electrodes 201a–201d aligned in a row substantially parallel to the outermost side of the one of the waveguides 203 opposite to the main electrode 205 are connectable to a variable outputs $V_a$–$V_d$ of a voltage source or sources. Each of a second set of four electrodes 202a–202d aligned in a row substantially parallel to the outer most side of one of the waveguides 204 opposite to the main electrode 205 and the first set of electrodes 201a–201d are connectable to variable outputs $V_a$–$V_d$ of a voltage source or sources.

When the voltages applied to the middle two electrodes 201b, 201c; 202b, 202c of the first and second sets of electrodes have equal value and like polarity and the voltages applied to the outer electrodes 201a, 201d; 202a, 202d of the first and second sets of electrodes have equal value and like polarity, the light travelling in one waveguide is barred from transferring to another waveguide. When the voltages applied to the middle two electrodes 201b, 201c; 202b, 202c of the first and second sets of electrodes have equal value and opposite polarity and the voltages applied to the outer electrodes 201a, 201d; 202a, 202d of the first and second sets of electrodes have equal value and opposite polarity, the light travelling in one waveguide is barred from transferring to another waveguide, the light travelling in one waveguide crosses to another waveguide.

It should be noted that the waveguides 203, 204, the main electrode 205, the first and second sets of electrodes 201, 202 are in a planar relationship to each other. Like the earlier embodiments, the wafer 200 can be an electro-optic material of a polarization dependent material such as $LiNbO_3$. Also, the composite length of each of the first and second sets of electrodes 201, 202 is approximately equal to the length of the main electrode 205.

While the present invention has been disclosed and described with reference to specific embodiments, it will be appreciated that variations and modification may be made herein without departing from the scope of the invention. For example, various manners of creating coupling and/or index perturbations are possible. Therefore, it is intended that the following claims cover each such variation and modification as falls within the true spirit and scope of the invention.

What is claimed is:

1. A polarization independent directional optical coupler comprising:
    a mono-crystalline wafer of electro-optic material;
    at least two light waveguides at an upper surface of said wafer and forming an interaction region where said at least two waveguides are closely adjacent and substantially parallel to one another; and
    electrodes positioned along said interaction region of said at least two waveguides wherein said electrodes include
    a main electrode formed substantially parallel to said at least two waveguides on one side of said waveguides, said main electrode being grounded;
    a first electrode formed on a side of said waveguides opposite to main electrode, said first electrode being connectable to a first voltage source, the output of which is changeable;
    a second electrode formed on a side of said waveguides opposite to side main electrode and adjacent to said first electrode, said second electrode being connectable to a second voltage source, the output of which is changeable;
    a third electrode formed on a side of said waveguides opposite to side main electrode and adjacent to said second electrode, said third electrode being connectable to a third voltage source, the output of which is changeable;
    a fourth electrode formed on a side of said waveguides opposite to side main electrode and adjacent to said third electrode, said fourth electrode being connectable to a fourth voltage source, the output of which is changeable,
    wherein when the outputs of said second and third voltage sources have equal value and like polarity and the outputs of said first and fourth voltage sources have equal value and like polarity the light travelling in one waveguide is barred from transferring to another waveguide, and,
    when the outputs of said second and third voltage sources have equal value and opposite polarity and the outputs of said first and fourth voltage sources have equal value and opposite polarity, the light travelling in one waveguide crosses to another waveguide.

2. A coupler according to claim 1, wherein said electro-optic material comprises a polarization dependent material.

3. A coupler according to claim 2, wherein the electro-optic material includes $LiNbO_3$.

4. A coupler according to claim 1, wherein a composite length of said first, second, third and fourth electrodes is approximately equal to the length of said main electrode.

5. A coupler according to claim 1, wherein said main electrode includes more than one separate electrode.

6. A coupler according to claim 1, wherein said first and fourth electrodes are electrically coupled, and wherein said second and third electrodes are electrically coupled.

7. A coupler comprising:
    a mono-crystalline wafer of electro-optic material;
    at least two light waveguides formed on said wafer and forming an interaction region where said at least two waveguides are closely adjacent and substantially parallel to one another; and
    electrodes positioned along said interaction region of said at least two waveguides wherein said electrodes include
    a main electrode formed substantially parallel said at least two waveguides on one side of said waveguides, said main electrode being grounded;
    a first electrode formed on a side of said waveguides opposite to said main electrode, said first electrode being connectable to a first voltage source, the output of which is changeable;
    a second electrode formed on a side of said waveguides opposite to said main electrode and adjacent to said first electrode, said second electrode being connectable to a second voltage source, the output of which is changeable;

a third electrode formed on a side of said waveguides opposite to said main electrode and adjacent to said second electrode, said third electrode being connectable to a third voltage source, the output of which is changeable;

a fourth electrode formed on a side of said waveguides opposite to said main electrode and adjacent to said third electrode, said fourth electrode being connectable to a fourth voltage source, the output of which is changeable, wherein when the outputs of said second and third voltage sources have equal value and like polarity and the outputs of said first and fourth voltage sources have equal value and like polarity, the light travelling in one waveguide is barred from transferring to another waveguide, and when the outputs of said second and third voltage sources have equal value and opposite polarity and the outputs of said first and fourth voltage sources have equal value and opposite polarity, the light travelling in one waveguide crosses to another waveguide.

8. A coupler according to claim 7, wherein said main electrode is formed on one side of said waveguides and said first, second, third and fourth electrodes are formed on the other side of said waveguides opposite to said main electrode.

9. A coupler according to claim 7, wherein a composite length of the first, second, third and fourth electrodes is approximately equal to the length of the main electrode.

10. A coupler according to claim 7, wherein said main electrode comprises more than one separate electrode.

11. A coupler according to claim 7, wherein said first and fourth electrodes are electrically coupled, and wherein said second and third electrodes are electrically coupled.

12. A polarization independent directional coupler comprising:

a mono-crystalline wafer of electro-optic material;

at least two light waveguides at an upper surface of said wafer and forming an interaction region where said waveguides are closely adjacent and substantially parallel to one another; and electrodes positioned along said interaction region of said waveguides wherein said electrodes include a main electrode formed substantially parallel to and between said waveguides, said main electrode being electrically grounded;

a first set of four electrodes aligned in a row substantially parallel to a side of said waveguides opposite to main electrode, each of said first four electrodes being connectable to a variable output of a voltage source;

a second set of four electrodes aligned in a row substantially parallel to a side of said waveguides opposite to side main electrode and said first set of electrodes, each of said second four electrodes being connectable to a variable output of a voltage source;

wherein when the voltages applied to the middle two electrodes of the first and second sets of electrodes have equal value and like polarity and the voltages applied to the outer electrodes of the first and second sets of electrodes have equal value and like polarity, the light travelling in one waveguide is barred from transferring to another waveguide, and when the voltages applied to the middle two electrodes of the first and second sets of electrodes have equal value and opposite polarity and the voltages applied to the outer electrodes of the first and second sets of electrodes have equal value and opposite polarity, the light travelling in one waveguide is barred from transferring to another waveguide, the light travelling in one waveguide crosses to another waveguide.

13. A coupler according to claim 12, wherein said waveguides, said main electrode, and said first and second sets of electrodes are in a stacked relationship to each other and said main electrode includes a coupling region between said waveguides.

14. A coupler according to claim 12, wherein said waveguides, said main electrode, and said first and second sets of electrodes are in a planar relationship to each other.

15. A coupler according to claim 12, wherein said electro-optic material comprises a polarization dependent material.

16. A coupler according to claim 15, wherein the electro-optic material includes LiNbO$_3$.

17. A coupler according to claim 12, wherein a composite length of each of said first set and second set of electrodes are approximately equal to the length of said main electrode.

18. A coupler comprising:

a mono-crystalline wafer of electro-optic material;

at least two light waveguides formed on said wafer and forming an interaction region where said waveguides are closely adjacent and substantially parallel to one another in a stacked relationship; and electrodes positioned along an interaction region of said waveguides wherein said electrodes include a main electrode formed substantially parallel to and on one side of said waveguides, said main electrode being grounded;

a first set of electrodes aligned in a row along a side of one of said waveguides opposite to main electrode, each of said first set of electrodes being connectable a variable output of a voltage source;

a second set of electrodes aligned in a row along a side of another of said waveguides opposite to said main electrode and adjacent to said first set of electrodes, each of said second set of electrodes being connectable to a variable output of a voltage source;

wherein when the voltage applied to the middle two electrodes of said first and second set of electrodes have equal value and like polarity and the voltage applied to the outer two electrodes of said first and second sets of electrodes have equal value and like polarity, the light travelling in one waveguide is barred from transferring to another waveguide, and, when the voltage applied to the middle two electrodes of said first and second set of electrodes have equal value and opposite polarity and the voltage applied to the outer two electrodes of said first and second sets of electrodes have equal value and opposite polarity, the light travelling in one waveguide crosses to another waveguide.

19. A coupler according to claim 18, wherein said main electrode includes more than one separate electrode.

20. A coupler according to claim 18, wherein a composite length of the first set and second set of electrodes are approximately equal to the length of said main electrode.

* * * * *